(12) United States Patent
Anand

(10) Patent No.: US 10,579,597 B1
(45) Date of Patent: Mar. 3, 2020

(54) DATA-TIERING SERVICE WITH MULTIPLE COLD TIER QUALITY OF SERVICE LEVELS

(71) Applicant: Amazon Technologies, Inc., Seattle, WA (US)

(72) Inventor: Manu Anand, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 15/866,332

(22) Filed: Jan. 9, 2018

(51) Int. Cl.

| | |
|---|---|
| *G06F 17/30* | (2006.01) |
| *G06F 16/182* | (2019.01) |
| *H04L 29/08* | (2006.01) |
| *G06F 21/60* | (2013.01) |
| *G06F 16/13* | (2019.01) |
| *G06F 16/178* | (2019.01) |
| *G06F 16/28* | (2019.01) |

(52) U.S. Cl.
CPC .......... *G06F 16/183* (2019.01); *G06F 16/13* (2019.01); *G06F 16/178* (2019.01); *G06F 16/289* (2019.01); *G06F 21/602* (2013.01); *H04L 67/1097* (2013.01); *H04L 67/2842* (2013.01)

(58) Field of Classification Search
CPC .... G06F 16/183; G06F 16/289; G06F 16/178; G06F 16/13; G06F 21/602; H04L 67/1097; H04L 67/2842
See application file for complete search history.

(56) References Cited

U.S. PATENT DOCUMENTS

| | | | |
|---|---|---|---|
| 5,404,510 A | 4/1995 | Smith et al. | |
| 5,918,225 A | 6/1999 | White et al. | |
| 6,502,088 B1 | 12/2002 | Gajda et al. | |
| 6,591,269 B1 | 7/2003 | Ponnekanti | |
| 6,778,977 B1 | 8/2004 | Avadhanam et al. | |
| 6,823,382 B2 * | 11/2004 | Stone .................. | G06F 11/0715 709/202 |
| 6,914,883 B2 | 7/2005 | Dharanikota | |

(Continued)

OTHER PUBLICATIONS

Prasun Gupta et al., A New Throught Paradigm: Delivering Cost Effective and Ubiquitously Accessible Storage with Enterprise Backup System via a Multi-Tiered Storage Framework, SIGUCCS '07: Proceedings of the 35th Annual ACM SIGUCCS Fall Conference, pp. 146-152, Oct. (Year: 2007).*

(Continued)

*Primary Examiner* — Greta L Robinson
(74) *Attorney, Agent, or Firm* — Robert C. Kowert; Kowert, Hood, Munyon, Rankin & Goetzel, P.C.

(57) ABSTRACT

A tiering service that supports multiple cold tier quality of service (QoS) policies includes a configuration manager that receives a specification for one or more QoS parameters for a cold tier and reserves resources of a provider network to implement the cold tier in accordance with the specified QoS parameters. The QoS parameters may specify one of a plurality of supported cold tier access level policies for the cold tier. Also other QoS parameters may be specified. The cold tier access level policies may specify combinations of local and/or remote resources to be used for the cold tier. In some embodiments, a client may specify or modify cold tier QoS policies in order to perform different tasks. Also a client may modify the specified QoS policies for the cold tier after completion of the tasks or to perform other tasks.

20 Claims, 11 Drawing Sheets

(56) References Cited

U.S. PATENT DOCUMENTS

| | | | |
|---|---|---|---|
| 6,947,750 B2 | 9/2005 | Kakani et al. | |
| 8,239,584 B1 | 8/2012 | Rabe et al. | |
| 8,595,267 B2 | 11/2013 | Sivasubramanian et al. | |
| 8,918,435 B2 | 12/2014 | Sivasubramanian et al. | |
| 9,264,409 B2* | 2/2016 | Sproles | H04L 63/0485 |
| 9,432,459 B2 | 8/2016 | Sivasubramanian et al. | |
| 9,639,546 B1 | 5/2017 | Gorski et al. | |
| 9,754,009 B2 | 9/2017 | Sivasubramanian et al. | |
| 10,152,239 B1* | 12/2018 | Tamilmani | G06F 3/067 |
| 2002/0087699 A1 | 7/2002 | Karagiannis et al. | |
| 2007/0195788 A1 | 8/2007 | Vasamsetti et al. | |
| 2012/0317155 A1 | 12/2012 | Ogasawara et al. | |
| 2014/0122778 A1* | 5/2014 | O'Brien | G06F 3/061 |
| | | | 711/103 |
| 2018/0324250 A1* | 11/2018 | Fiske | H04L 67/10 |

OTHER PUBLICATIONS

U.S. Appl. No. 16/367,100, filed Mar. 27, 2019, Binu Kuttikkattu Idicula.
U.S. Appl. No. 15/690,175, filed Aug. 29, 2017, Manu Anand.
U.S. Appl. No. 15/861,508, filed Jan. 3, 2018, Manu Anand.

* cited by examiner

US 10,579,597 B1

DATA-TIERING SERVICE WITH MULTIPLE COLD TIER QUALITY OF SERVICE LEVELS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to clients. Some data center operators provide network access, power, and secure installation facilities for hardware owned by various clients, while other data center operators provide "full service" facilities that also include hardware resources made available for use by their clients.

As the scale and scope of distributed systems have increased, the tasks of provisioning, administering, and managing resources of the distributed systems have become increasingly more complicated. A distributed system referred to herein as a "provider network" may offer, to various clients, access to computing resources and services implemented using the distributed system. When clients access such resources remotely, the resources may be said to reside "in the cloud" and may represent cloud computing resources. For example, using such resources, the provider network may store data on behalf of clients in various types of storage solutions. The provider network may offer various types of services for managing the cloud computing resources, including storage-related services for managing stored data.

For various reasons, some pieces of data stored in a distributed system, such as a provider network, for a client may be accessed less frequently than other pieces of data. Also delays in access to some pieces of data stored in a distributed system for a client may have less of an impact on the client's operations than delays in accessing other pieces of data stored in the distributed system for the client. As access requirements change, some pieces of data stored in a distributed system may end up being stored on resources that meet greater (and more costly) access requirements for the pieces of data than necessary to meet the client's needs. For clients that store large quantities of such pieces of data, storage of the pieces of data in such higher performance resources may lead to an inefficient allocation of storage resources and unnecessary storage costs.

In some situations less frequently accessed pieces of data may be relocated to a lower cost storage. This may reduce storage costs and remove the less frequently accessed pieces of data from a higher performance storage, thus improving performance of the higher performance storage. In some instances, the less-frequently accessed pieces of data may be stored in a remote storage that is remote from a primary storage. Storing the less-frequently accessed pieces of data in a remote storage may make analysis and look-up of the less-frequently accessed pieces of data more resource intensive and slower than when the pieces of data are stored in the primary storage. In some circumstances, additional resources and time required to access pieces of data stored remotely may be minimal due to the infrequent nature access requests for the data. However, in other circumstances such resource costs and delays may negatively impact performance and client experience.

Figure 1:
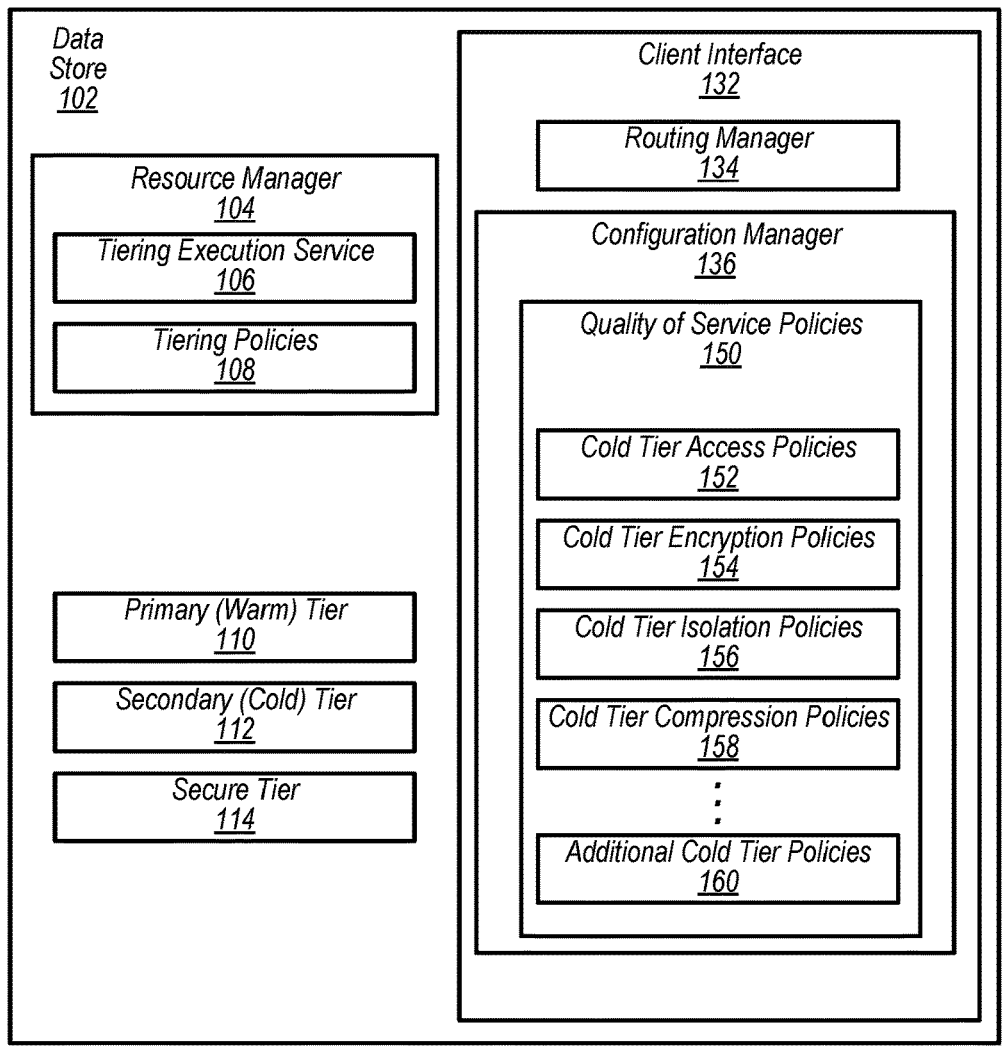
FIG. 1 illustrates a data store comprising a warm tier, a cold tier, and a configuration manager that implements quality of service policies for the cold tier, according to some embodiments.
Figure 1:
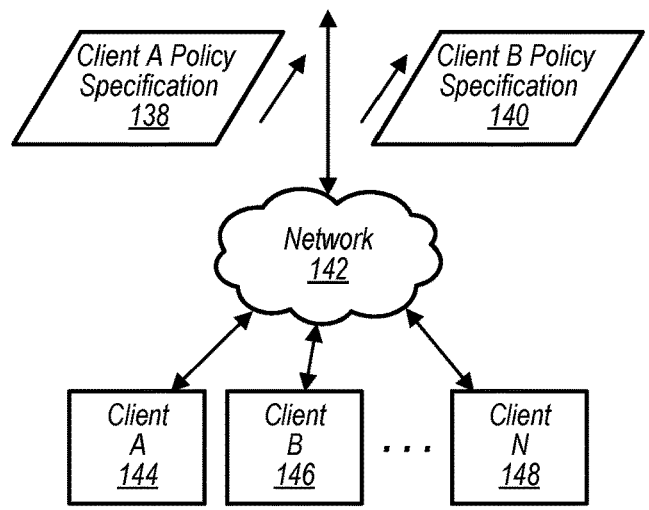

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a data tiering service with multiple cold tier quality of service (QoS) levels are described herein.

In one embodiment, a system includes multiple nodes configured to implement a data store comprising a warm tier and a cold tier, wherein the warm tier has a lower latency for data access than the cold tier. For example, the warm tier may comprise one or more non-searchable query language (NoSQL) tables and the cold tier may comprise flat files comprising data items relocated from the one or more NoSQL tables to the cold tier. In some embodiments, the flat files may be stored in a remote object-based storage system or may be locally stored on one or more local nodes local to a node implementing the one or more NoSQL tables. The system also includes one or more computing devices configured to implement a configuration manager for the warm tier and the cold tier. The configuration manager is configured to receive a cold tier configuration request indicating one or more of a plurality of cold tier quality of service (QoS) parameters supported by the system for storing data items in the cold tier that have been relocated to the cold tier from the warm tier. Also, in response to receiving such a request, the configuration manager is configured to reserve resources to implement the cold tier in accordance with the one or more QoS parameters indicated in the cold tier configuration request. Additionally, in response to the request indicating a first cold tier access level, the configuration manager is configured to reserve one or more resources to implement the cold tier on a local node, local to a node implementing the warm tier. Alternatively, in response to the request indicating a second cold tier access level, the configuration manager is configured to reserve one or more resources to implement the cold tier on a remote node, remote from the node implementing the warm tier. In some embodiments, the request may indicate one or more other QoS parameters, such as an encryption parameter, an isolation parameter, a compression parameter, or other parameters, and the configuration manager may reserve one or more resources to implement the cold tier in accordance with the other QoS parameters indicated in the cold tier configuration request.

In some embodiments, the system also includes a resource manager configured to manage relocation of one or more data items from the warm tier to the cold tier in accordance with conditions included in a selected tiering policy. The resource manager is also configured to include one or more respective tombstones in the warm tier, each comprising an indication of a data item that has been relocated from the warm tier to the cold tier, wherein the respective indications included in the one or more tombstones are in accordance with a selected tombstone forwarding policy. In some embodiments, the resource manager and the configuration manager may be included in a data storage system that implements the data store or may be a separate service that interacts with a data store to perform tiering and cold tier QoS configuration management as described herein.

In some embodiments, the system also includes a routing manager. The routing manager may be configured to receive a request directed to a data item that has been relocated from the warm tier to the cold tier; locate a tombstone included in the warm tier corresponding to the data item that has been relocated to the cold tier; receive the data item stored in the cold tier, wherein the data item stored in the cold tier is accessed based on the indication of the location included in the tombstone in the warm tier; and provide the received data item in response to the request. In some embodiments, a tombstone may indicate to the routing manager that a data item is stored in a local cold tier or may indicate that the data item is stored in a remote cold tier. The routing manager may then query the appropriate local cold tier or remote cold tier to locate the data item according to the indication included in the tombstone for the data item stored in the warm tier. In some embodiments, a warm tier table may be configured such that all data items relocated to a cold tier from the warm tier table are relocated to a local cold tier or a remote cold tier. In such embodiments, a tombstone stored in the warm tier may simply indicate that a data item has been relocated to a cold tier, and it may be known that the cold tier is a local cold tier or a remote cold tier.

In some embodiments, a method includes receiving a cold tier configuration request for configuring a cold tier of a data store for a client of a data storage service, wherein the data store comprises a warm tier and the cold tier, wherein the warm tier has a lower latency for data access than the cold tier, wherein the cold tier configuration request indicates one or more quality of service (QoS) parameters for the cold tier, and wherein the one or more QoS parameters indicate at least a first cold tier access level for the cold tier. The method further includes reserving one or more resources to implement the cold tier of the data store in accordance with the one or more QoS parameters, wherein, in accordance with the first cold tier access level, the one or more resources are reserved at a local node, local to a node implementing the warm tier of the data store. In addition, the method includes receiving another cold tier configuration request for configuring another cold tier for another client of the data storage service, wherein the other cold tier configuration request indicates one or more QoS parameters for the other cold tier, wherein the one or more QoS parameters indicates at least a second cold tier access level for the other cold tier and reserving one or more resources to implement the other cold tier in accordance with the one or more QoS parameters indicated in the other request, wherein, in accordance with the second cold tier access level, the one or more resources for the other cold tier are reserved at one or more remote nodes, remote from a node implementing the warm tier.

In some embodiments, a non-transitory computer readable medium stores program instructions that, when executed by one or more processors, cause the one or more processors to receive a cold tier configuration request indicating one or more quality of service (QoS) parameters for storing data items that have been relocated from a warm tier to a cold tier of a data store, wherein the warm tier has a lower latency for data access than the cold tier; and reserve resources to implement the cold tier in accordance with the one or more quality of service parameters indicated in the cold tier configuration request. Also, in response to the request indicating a first cold tier access level, the program instructions cause the one or more processors to reserve one or more resources to implement the cold tier at a local node, local to a node implementing the warm tier. Alternatively, in response to the request indicating a different cold tier access level, the program instructions cause the one or more processors to reserve one or more resources to implement the cold tier at a remote node, remote from the node implementing the warm tier.

In some embodiments, various tiers of a data store, such as a warm (primary) tier, a cold (secondary) tier, or a secure tier may be implemented using different storage subsystems or services that may provide different storage characteristics. This may allow a client to store less frequently accessed data in a cheaper storage subsystem or service, while storing more frequently accessed data in a lower latency storage subsystem or service. Thus a client may be provided low latency access to frequently accessed data while reducing storage costs for infrequently accessed data. For example, a warm tier may be implemented using a NoSQL database system, while a cold tier may be implemented using an object-based storage system, as two examples. In some embodiments, data items stored in a cold tier may be stored in flat files locally on one or more nodes local to a warm tier. Storing the data items in the flat files may improve performance of the warm tier by reducing a quantity of data items stored in the warm tier, while also providing lower access latencies than cold tier flat files stored remotely, for example in a separately managed object-based storage system.

Typically, the warm tier may offer data access with lower latency than the cold tier. Due to the differing cost and performance characteristics of the tiers, the warm tier may be used to store more frequently accessed data and may be referred to as a "primary" tier, while the cold tier may be used to store less frequently accessed data (typically in larger quantities) and may be referred to as a "secondary" tier. Also, a secure tier may encrypt or otherwise protect a client's data stored in the secure tier. In some embodiments, a cold tier may be configured to encrypt or otherwise protect a client's data stored in the cold tier. The data store and its constituent tiers may offer multi-tenancy to clients, e.g., clients of a provider network. Accordingly, the data store may also be referred to as a multi-tenant data store. In some embodiments, the data store and its constituent tiers may offer dynamic sizing to clients such that the available capacity for a particular client's storage needs may be increased dynamically, e.g., using storage resources from a provider network. The data store may include any suitable number and configuration of storage tiers implemented using any suitable storage subsystems and/or storage services. In one embodiment, the type, number, and/or configuration of the different storage tiers may be configured by a client of the data store. Additionally, policies for using the various tiers (e.g., policies for deciding which tier to use for storing a particular data item) may be configured by a client of the data store.

The various tiers of a data store may store data items on behalf of a plurality of clients (also referred to herein as tenants, customers, or clients). The data items may be structured differently in different tiers. For example, in the warm tier, the data items may include key-value pairs and associated meta-data, and the key-value pairs may be organized into data structures referred to as scopes or tables. The data items (e.g., key-value pairs) and/or data structures that contain them (e.g., scopes or tables) may be specific to particular clients, such that a particular data item or data structure may be said to belong to a particular client or to be owned by a particular client. The client that owns particular data items may have access to read, write, or modify those data items, in some cases exclusive of other clients. As another example, in the cold tier or secondary tier, the data items may be structured as objects and stored in secure, durable, highly scalable object storage in storage locations referred to as "buckets." A storage service object, for example, may include data, a key, and metadata; the object key (or key name, or identifier) which uniquely identifies the key-addressable object in a bucket, and an index of such keys. In some embodiments, the cold tier may represent block-based storage (e.g., of 64 kilobyte blocks). In some embodiments, a single storage service object stored in the cold tier may include multiple data items in the storage object, wherein the data items are key-value pairs with associated meta-data that have been relocated from the warm tier to the cold tier.

In some embodiments, according to a first cold tier access level, cold tier data objects may be stored locally on a same node that implements the warm tier or may be stored on another local node local to one or more nodes that implement the warm tier. Additionally, according to another cold tier access level, cold tier data objects may be stored remotely on one or more nodes that are remote from one or more nodes that implement the warm tier. Additionally, according to yet another cold tier access level, cold tier data objects may be stored remotely while a directory for data items included in the cold tier are cached at a local node, such as a node that implements the warm tier or a node local to the node that implements the warm tier. According to another cold tier access level, cold tier data objects may be replicated, such that multiple local nodes store the cold tier data objects, e.g. the cold tier data object and one or more replicas of the cold tier data object. This configuration may improve data access performance by allowing for load balancing and parallel processing of data accesses to the cold tier data objects. Also, according to yet another cold tier access level, cold tier data objects may be stored on a single-tenant local node, wherein the single-tenant local node is not shared with other clients of the provider network.

In some embodiments, clients may use client devices to perform or request suitable operations for reading, writing, or modifying data items in a data store. The data store may expose a client interface to enable clients to participate in such operations. In some embodiments, a client interface may represent a single, unified interface to all the tiers (e.g., the warm tier, cold tier, and/or the secure tier(s)). The client interface may include any suitable user and/or programmatic interfaces, such as application programming interfaces (API) enabling operations such as "put" and "get."

In some embodiments, the tiers of a data store may be provided using one or more storage-related services, such as a relational database service, a non-relational or NoSQL database service, an object storage service that allows clients to store arbitrary amounts of data in the form of objects, a storage service that provides block-device level interfaces, and so on. A client of such a storage-related service may programmatically request the establishment of a portion of a data store, such as an instance of a (relational or non-relational) database that can be used for numerous database tables or scopes and associated metadata such as indexes and the like. In the case of an object storage service, at least a portion of a data store may include a collection of objects. In the case of a storage service providing block-device interfaces, the corresponding tier of the data store may be implemented using one or more volumes.

Generally speaking, the term "data store," as used herein, may refer to a collection of one or more data items and/or data objects and associated metadata set up on behalf of one or more clients. After a data store has been created, a client may start populating various data items within the data store, e.g., using requests for operations such as "create object," "update object," "insert object," "delete object," or other similar requests at various granularity levels depending on the data store type. For example, in the case of a database, operations such as creates, updates, and deletes may be supported at the table level, the data item level, and for various metadata objects such as indexes, views, and the like. Clients may also issue read requests of various kinds, such as queries in the case of database objects.

Also a client may control conditions that cause the client's data to be relocated between a warm tier and a cold tier or between secure tiers of a data store by selecting a tiering policy from a plurality of tiering policies supported by the data store. Additionally, a client may control how data that has been relocated from a warm tier to a cold tier or between secure tiers is accessed by selecting a tombstone forwarding policy from among a plurality of tombstone forwarding policies supported by the data store.

Illustrative System Configuration

Some data stores that support tiering data between a warm tier and a cold tier may only support a single "one-size fits all" cold tier solution. Also, some data store clients may generate customized code to allow applications, such as business analytics, to access cold tier data. However, retrieving data from a cold tier in such systems may be slow and costly in terms of computing resources. For example, because cold tier data is stored remotely from warm tier nodes that implement a warm tier table, multiple systems and routing redirects may be required to locate a data item relocated from the warm tier to the cold tier. Also, in such systems, when a data item stored in the cold tier is requested, for example in response to a request directed to the data item received at the warm tier, a large portion of the cold tier data may have to be scanned to locate the requested data item. This too may result in high overhead processing costs and high latency. For example, a cold tier may store data items relocated from multiple warm tier tables. Thus, accessing a data item relocated to the cold tier may involve a routing interface determining the requested data item is no longer stored in the warm tier, the routing interface querying a cold tier interface for the requested data item, a cold tier engine scanning large directories comprising relocated data items for multiple warm tier tables to identify a storage location of the requested data item in the cold tier, the cold tier engine or the routing manager reading data for the requested data item from a cold tier file, and providing the data for the requested data item as a result of the initial access request.

For some clients, efficiencies gained by consolidating storage of cold tier data items on remote low cost resources for multiple warm tier tables may be worth any resource costs incurred to access the cold tier data items and may be worth any delays in receiving requested cold tier data items. However, for other clients of a data storage service, a middle ground approach that is less costly than storing data items in the warm tier and that provides faster data accesses than a remote cold tier may be desirable. Also a single client may configure different tables of the client to have different quality of service polices. For example, such a client or clients may desire a local cold tier, a local cold tier with cold tier replicas, a remote cold tier with a local cache, or other cold tier access policies that provide varying levels of intermediate performance between a warm tier and a remote cold tier.

Also, client needs may vary over time. For example, a client may be provided a lowest cost cold tier solution as a default configuration, but may desire to upgrade to a more responsive cold tier access policy when performing a cold tier search. For example, when performing business analytics using cold tier data.

In order to resolve such issues and other issues, a data tiering service with multiple cold tier quality of service (QoS) levels may allow a client to specify a cold tier configuration for the client's cold tier and to seamlessly modify the client's cold tier configuration due to changing conditions, such as to perform a search or for other reasons. Also, a data store may include a common client interface for accessing data items included in the warm tier and the cold tier. Thus, an application, such as a business analytics application, may access cold tier data items and warm tier data items seamlessly without customized code to allow access to the cold tier.

In some embodiments, a data tiering service with multiple cold tier quality of service levels may allow a client to more efficiently manage a data store by adjusting QoS parameters of a cold tier of the data store. For example, such a data tiering service may be more efficient than other data stores because it allows the client to modify the configuration of the cold tier to a lower access level during periods of infrequent access to the cold tier, without restricting the cold tier to a fixed higher access level that is not needed when data accesses are infrequent. Conversely, when data accesses are more frequent, such as when performing a cold tier search or performing business analytics on cold tier data, the client may change the configuration of the cold tier to a higher access level without being restricted to a lower access level during such periods of more frequent access to the cold tier. Thus, a cold tier configuration may be adjusted to meet current client needs without misallocating higher-performance resources that are underutilized and without sacrificing performance by restricting a cold tier to lower-performance resources when higher performance resources are better suited to perform particular tasks.

In some embodiments, a data tiering service with multiple cold tier quality of service levels as described herein may be a standalone service that coordinates tiering and cold tier configurations in one or more separate primary storage systems and one or more separate secondary storage systems. Also, a data tiering service with multiple cold tier quality of service levels may coordinate tiering of data between separate services such as a database service and a higher latency storage service. In other embodiments, a data tiering service with multiple cold tier quality of service levels may be included in or integrated into a data store that includes a plurality of different storage tiers.

For example, FIG. 1 illustrates a data store comprising a warm tier, a cold tier, and a configuration manager that implements quality of service policies for the cold tier, according to some embodiments.

Data store 102 includes resource manager 104, which includes tiering execution service 106. Resource manager 104 also stores tiering policies 108. Data store 102 also includes primary tier 110, secondary tier 112, and secure tier 114. As discussed in more detail in FIGS. 2A-2D primary tier 110, secondary tier 112, and secure tier 114 may be implemented on nodes of one or more storage systems that implement a data store, such as data store 102. In addition, data store 102 includes a client interface 132 that includes a routing manager 134 and a configuration manager 136. In some embodiments, a client may submit data operation requests such as "get", "put", "modify", etc. via a client interface, such as client interface 132, and a routing manager, such as routing manager 134, may route the requests to the appropriate tier, such as the primary tier 110, the secondary tier 112, or the secure tier 114. In some embodiments, a configuration manager, such as configuration manager 136, may receive via a client interface, such as client interface 132, one or more client policy specifications from one or more clients of a data store. For example, configuration manager 136 is illustrated receiving client A policy specification 138 from client A 144 via network 142, and receiving client B policy specification 140 from client B 146 via network 142. In some embodiments, any number of clients such as clients A 144, B 146 through N 148 may configure warm and cold tiers of a data store, such as data store 102, or of a data storage service that manages one or more data stores.

In some embodiments, a client policy specification, such as client A policy specification 138 or client B policy specification 140 may include a cold tier configuration request. Additionally, in some embodiments a cold tier configuration request may specify one or more quality of service (QoS) parameters for a cold tier that is to be configured in response to the cold tier configuration request. Additionally, a client policy specification, such as client A policy specification 138 or client B policy specification 140, may include a cold tier modification request comprising one or more requested changes to be applied to an existing cold tier, such as changes to one or more QoS parameters of the existing cold tier.

In some embodiments, at least some QoS parameters that may be specified in a cold tier configuration request or a cold tier modification request include a specified cold tier access policy, such as a remote cold tier access policy, a local cold tier access policy, a remote cold tier with local caching access policy, or a local cold tier with local replicas cold tier access policy, as a few examples. The cold tier configuration request or cold tier modification request may also include a specified encryption policy for the cold tier, a specified isolation policy for the cold tier, a specified compression policy for the cold tier, or one or more other specified QoS parameters for the cold tier. In some embodiments, the specified QoS parameters included in the cold tier configuration request or the cold tier modification request may correspond to one or more QoS policies supported by the data store. Additionally, in response to receiving the cold tier configuration request or the cold tier modification request comprising the one or more respective QoS parameters, a configuration manager, such as configuration manager 136, may reserve resources and configure the reserved resources in accordance with the specified QoS parameters. For example, configuration manager 136 may configure cold tier resources that implement cold tier 112 in accordance with a specified cold tier access policy, such as one of cold tier access policies 152, a specified cold tier encryption policy, such as one of cold tier encryption policies 154, a specified cold tier isolation policy, such as one of cold tier isolation policies 156, a cold tier compression policy, such as one of cold tier compression policies 158, or another specified cold tier QoS policy, such as one of additional cold tier policies 160.

In some embodiments, cold tier encryption policies 154, may include an encryption policy for data at rest, such as data items stored in the cold tier. In some embodiments, cold tier encryption policies 154, may also include an encryption policy for data in transit, such as data items in the process of being relocated from a warm tier to a cold tier or being provided from a cold tier. In some embodiments, cold tier encryption policies 154, may include an encryption policy that allows a client to submit a client specified encryption key for encrypting the client's data. In other embodiments, cold tier encryption polices 154, may include a cold tier encryption policy wherein a configuration manager, such as configuration manager 136, manages encryption keys on behalf of the client without the client's involvement. For example, the configuration manager may encrypt data items when relocating the data items from the warm tier to the cold tier and/or encrypt the data items while stored in the cold tier in a manner transparent to a client of the data store.

In some embodiments, cold tier isolation policies 154 may include a default isolation policy wherein data items of a client are stored in a shared cold tier, or a logically isolated cold tier that is implemented on shared resources. The cold tier policies 154 may also include one or more cold tier isolation policies that a client may request that specify data items of the client are to be stored in a logically isolated cold tier or that a cold tier of the client is to be implemented on single-tenant hardware that is not shared with other clients of the provider network.

In some embodiments, cold tier compression policies 158 may include one or more compression algorithms that a client may specify for compression of data items of the client that are to be stored in the cold tier. In some embodiments, a client may submit a compression algorithm for compression of the client's data and the compression algorithm may be added to the cold tier compression policies 158 or a particular cold tier compression policy of cold tier compression policies 158 may be a cold tier compression policy for implementing a client provided compression algorithm. In some embodiments, different compression algorithms may be specified for different types of data items. For example, a picture, a video, or an audio data item may be compressed using a different compression algorithm than a text data item. Also different respective compression algorithms may be used to compress pictures, videos, and audio files.

In some embodiments, quality of service policies 150 may include other cold tier QoS policies, such as additional cold tier policies 160. For example, in some embodiments, additional cold tier policies 160 may include a cold tier policy allowing a client to specify a particular rate of transactions guaranteed to be supported by a cold tier, such as a number of transactions per second that is to be supported. Also, additional cold tier policies 160 may include a cold tier policy allowing a client to specify a quantity of data a cold tier is to be configured to store, such as a particular number of gigabytes, terabytes, etc. that a cold tier is to be configured to store.

In FIG. 1, configuration manager 136 and resource manager 104 are shown integrated into data store 102. However, in some embodiments, resource manager 104 and configuration manager 136 may be included as a stand-alone service that is separate from a data store, such as data store 102, and that interacts with the data store or tiers of the data store to implement client specified tiering policies, cold tier QoS policies, indexing policies and/or other client specified policies for the data store.

System 100 as illustrated in FIG. 1 includes data store 102, but may also include additional services. For example, in some embodiments, system 100 may be a provider network that includes additional computing, storage, or networking resources or other services offered to clients in addition to services associated with data store 102.

In some embodiments, warm tier 110 may be a database system and cold tier 112 may be an object-based data storage system. The warm tier 110 may typically be more expensive per unit of data stored and may have lower latency for data access than the cold tier 112. For example, in some embodiments warm tier 110 may be configured in accordance with various database formats or protocols, such as Aerospike, ArangoDB, Couchbase, Amazon Dynamo DB, FairCom c-tree ACE, Foundation DB, HyperDex, InfinityDB, MemcacheDB, MUMPS, Oracle NoSQL Database, OrientDB, Redis, Riak, Berkley DB, Google Engine, etc. In some embodiments, cold tier 112 may be implemented utilizing a lower cost storage service than is used for the warm tier 110, such as Amazon's Simple Storage Service (S3) or Amazon Glacier, as some examples. In some embodiments, data store 102 may include more than two tiers, e.g. a data store may include one or more additional lower tiers that have higher latencies and lower costs than the cold tier. In some embodiments, a cold tier, such as cold tier 112, may be implemented on local nodes, remote nodes, or a combination thereof.

In some embodiments resource manager 104 and client interface 132 may be included in a data store or, in other embodiments, client interface 132 and/or configuration manager 136 of client interface 132 and resource manager 104 may be included in a service that is separate from a data store and that interacts with a data store or data stores to cause data stored in the data store(s) to be tiered between warm and cold tiers and to configure QoS polices of the cold tiers.

In some embodiments, configuration manager 136 may implement a programmatic interface configured to receive database policy selections, cold tier configuration requests, tombstone forwarding policy selections, tiering policy selections, tiering scheduling policy selections, warm tier index creation requests, cold tier index creation requests, various indexing API calls, and various other database policy selections from a client of a data store or from a client of a client-configurable data tiering service.

In some embodiments, a resource manager, such as resource manager 104, may include a policy depository that stores policies, such as tiering policies 108, that are supported by a data store, such as data store 102. A resource manager, such as resource manager 104, may also include a tiering execution engine, such as tiering execution service 106. In some embodiments a tiering execution service or tiering engine executes tiering of data between a warm tier and a cold at defined time intervals in accordance with selected tiering policies specified by a client of a data store or a client of a client-configurable data tiering service that supports cold tier indexing.

In some embodiments, a tiering execution service, such as tiering execution service 106, may reach an execution interval for the tiering execution service, for example daily execution intervals or weekly execution intervals, and upon reaching the execution interval, the tiering execution service may evaluate a client's selected tiering policies to determine if any of the client's tables are ripe for tiering. If so, the tiering execution service may then determine data items included in the ripe tables or scopes that are to be relocated to a cold or secondary tier in accordance with the client's selected tiering policy or policies.

In some embodiments, a cold tier, such as cold tier 112, may be an object based storage that stores blobs of data as objects, wherein the objects are flat files without an internal hierarchy. In such embodiments, a cold tier may include one or more cold tier files that store data for multiple data items that have been relocated from the warm tier to the cold tier. The cold tier may also include at least one cold tier directory that indicates where data for respective ones of the data items are stored in the one or more cold tier flat files. For example, the cold tier directory may be organized based on data item key-values wherein the cold tier directory includes a key-value for each data item stored in the cold tier or a portion thereof. The cold tier directory file may also include a corresponding pointer to a location in a cold tier file where data for a data item having a respective key-value is stored. In some embodiments, in order to determine an item value or meta data value for a particular data item having a particular key included in the cold tier directory, it may be necessary to locate the key for the data item in the cold tier directory and then locate data for the data item stored in one of the cold tier flat files at a location indicated in the cold tier directory in order to determine an item-value or meta-data value for the data item having the particular key-value.

Example Cold Tier QoS Access Levels

FIGS. 2A-2D illustrate a more detailed view of a data store, such as data store 102 illustrated in FIG. 1, and show multiple cold tier configurations for multiple cold tier QoS access levels, according to some embodiments.

In some embodiments, client interface 132 shown in FIGS. 2A-2D may be the same client interface as client interface 132 shown in FIG. 1. Also resource manager 104, primary warm tier 110, secondary cold tier 112, and secure tier 114 may be the same as the corresponding components shown in FIG. 1.

Local Cold Tier Access Policy and Remote Cold Tier Access Policy

Figure 2A:
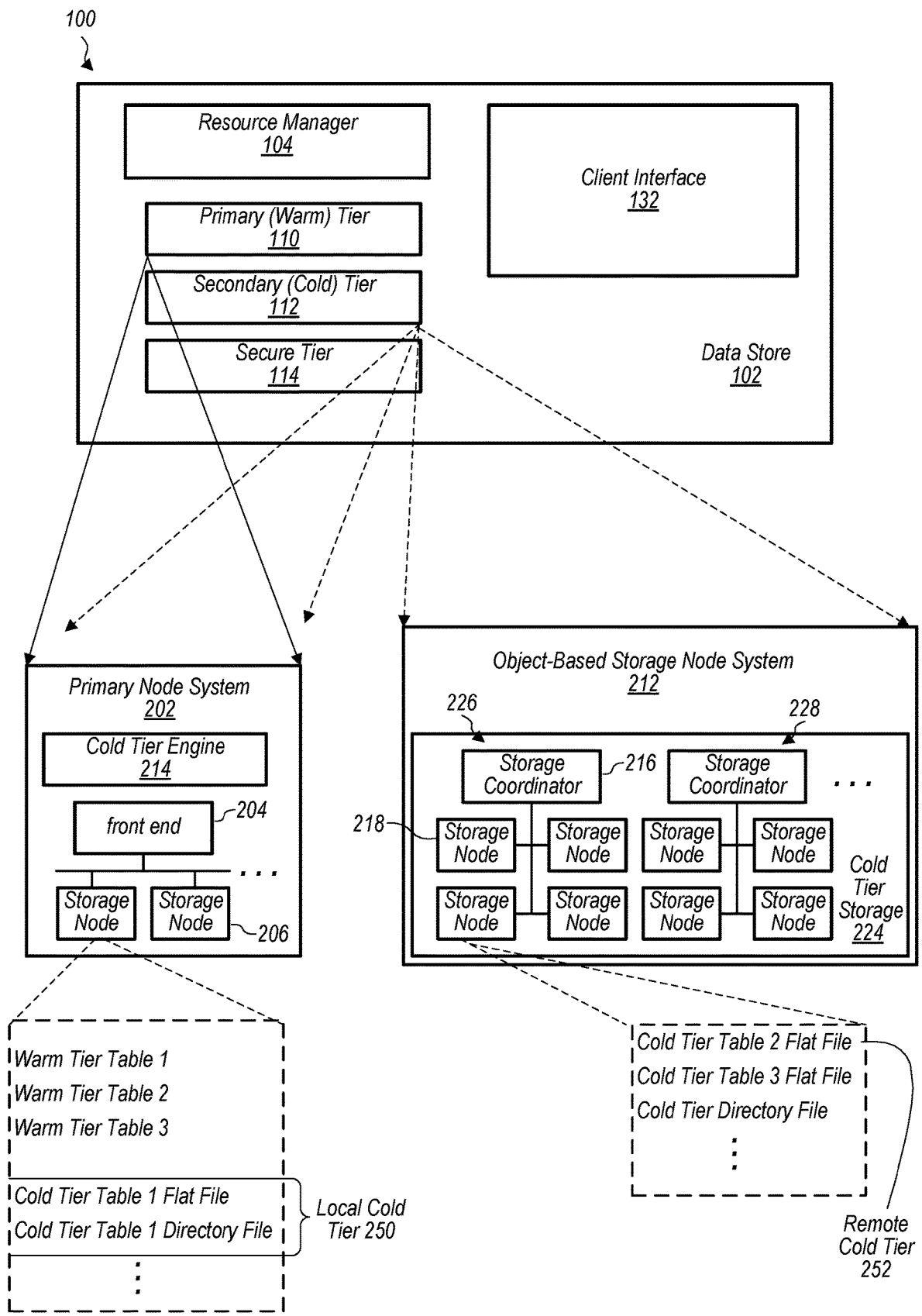
FIG. 2A illustrates further aspects of a warm tier, a local cold tier and, a remote cold tier, according to some embodiments.

FIG. 2A illustrates a detailed view of an example primary node system 202 that illustrates at least one possible configuration for warm tier 110 according to at least some embodiments. It is noted that where one or more instances of a given component may exist, reference to that component herein below may be made in either the singular or the plural. However, usage of either form is not intended to preclude the other. In various embodiments, the components illustrated in primary node system 202 may be implemented directly within computer hardware, as instructions directly or indirectly executable by computer hardware (e.g., a microprocessor or computer system), or using a combination of these techniques. For example, the components of primary node system 202 may be implemented by a distributed system including a number of computing nodes (or simply, nodes), such as the computer node embodiment illustrated in FIG. 8 and discussed below. In various embodiments, the functionality of a given storage service system component of a warm tier or cold tier may be implemented by a particular computing node or may be distributed across several computing nodes. In some embodiments, a given computing node may implement the functionality of more than one storage service system component of a warm tier or cold tier.

Generally speaking, storage service clients may encompass any type of client configurable to submit web services requests to primary node system 202 via a network. For example, a given storage service client may include a suitable version of a web browser, or a plugin module or other type of code module configured to execute as an extension to or within an execution environment provided by a web browser to provide storage service clients (e.g., client applications, users, and/or subscribers) access to the data storage services provided by primary node system 202. Alternatively, a storage service client may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, a storage service client may be an application configured to interact directly with data store 102. In various embodiments, storage service client may be configured to generate web services requests according to a Representational State Transfer (REST)-style web services architecture, a document- or message-based web services architecture, or another suitable web services architecture.

Generally speaking, data store 102 may be configured to implement one or more service endpoints configured to receive and process web services requests, such as requests to access tables maintained on behalf of clients/users by a data storage service, and/or the items and attributes stored in those tables. For example, data store 102 may include hardware and/or software configured to implement various service endpoints and to properly receive and process HTTP-based web services requests directed to those endpoints. In one embodiment, primary node system 202 may be implemented as a server system configured to receive web services requests from clients via client interface 132 and to forward them to various components that collectively implement a data storage system for processing. In other embodiments, primary node system 202 may be configured as a number of distinct systems (e.g., in a cluster topology) implementing load balancing and other request management features configured to dynamically manage large-scale web services request processing loads.

As illustrated in FIGS. 2A-2D, primary node system 202 may include a cold tier engine 214 and a front end 204 (which may be configured to receive, authenticate, parse, throttle and/or dispatch service requests, among other things), one or more administrative components, or auto admin instances (not shown), (which may be configured to provide a variety of visibility and/or control functions), and a plurality of storage node instances (shown as storage nodes 206), each of which may maintain and manage one or more tables on behalf of clients/users or on behalf of the data storage service (and its underlying system) itself. In some embodiments, a cold tier engine, such as cold tier engine 214, may manage storing data items in a cold tier that have been relocated from a warm tier to the cold tier. The cold tier engine may also manage processing requests for data items stored in the cold tier. For example, a routing manager may query a cold tier engine for a data item stored in a cold tier in response to a tombstone stored in the warm tier indicating that a particular data item has been relocated to the cold tier.

In addition to functioning as an addressable endpoint for clients' web services requests, in some embodiments, primary node system 202 may implement various client management features. For example, primary node system 202 may coordinate the metering and accounting of client usage of web services, including storage resources, such as by tracking the identities of requesting clients, the number and/or frequency of client requests, the size of tables and/or items stored or retrieved on behalf of clients, overall storage bandwidth used by clients, class of storage requested by clients, and/or any other measurable client usage parameter.

FIGS. 2A-2D also illustrate a detailed view of an example hardware implementation of object-based storage node system 212 that illustrates at least one possible configuration for cold tier 112 according to at least some embodiments.

In the illustrated embodiment shown in FIGS. 2A-2D, object-based storage node system 212 includes a cold tier storage 224 and in some embodiments may include a cold tier engine 214 (illustrated in primary node system 202). Note that a cold tier engine may be implemented in a primary node system 202 as shown in FIGS. 2A-2D or may be implemented in an object-based storage node system, such as object-based storage node system 212 (not illustrated in this configuration). The object-based storage node system 212 is shown including two areas 226 and 228. Each of areas 226 and 228 includes a respective coordinator instance 216. Areas 226 and 228 may also include various combinations of storage nodes 218, wherein at least one of the storage nodes is a keymap instance.

In one embodiment each of areas 226 and 228 may be considered a locus of independent or weakly correlated failure. That is, the probability of any given area experiencing a failure may be generally independent from or uncorrelated with the probability of failure of any other given area, or the correlation of failure probability may be less than a threshold amount.

Areas 226 and 228 may include additional levels of hierarchy (not shown). Additionally, different object-based storage node system components may communicate according to any suitable type of communication protocol. For example, where certain object-based storage node components are implemented as discrete applications or executable processes, they may communicate with one another using standard interprocess communication techniques that may be provided by an operating system or platform (e.g., remote procedure calls, queues, mailboxes, sockets, etc.), or by using standard or proprietary platform-independent communication protocols. Such protocols may include stateful or stateless protocols that may support arbitrary levels of handshaking/acknowledgement, error detection and correction, or other communication features as may be required or desired for the communicating cold tier components. For example, in one object-based storage node system embodiment, a substantial degree of inter-component communication may be implemented using a suitable Internet transport layer protocol, such as a version of Transmission Control Protocol (TCP), User Datagram Protocol (UDP) or a similar standard or proprietary transport protocol. However, it is also contemplated that communications among object based storage node system components may be implemented using protocols at higher layers of protocol abstraction.

In some embodiments, data items stored in a cold tier, such as cold tier 112, may be structured as objects and stored in secure, durable, highly scalable object storage in storage locations referred to as "buckets." For example, in embodiments in which cold tier 112 is implemented using Amazon's S3 service, an S3 object may include data, a key, and metadata. The object key (or key name) may uniquely identify the key-addressable object in a bucket, and an index of such keys may also be maintained as a key map in at least one of the storage nodes 218.

In some embodiments, data items selected for tiering from client tables stored in a warm tier such as data items from tables 1, 2, or 3, may be included in a cold tier file such as cold tier table 1 flat file of local cold tier 250 or cold tier table 2 flat file of remote cold tier 252 stored in one of storage nodes 218 of object-based storage node system 212. In some embodiments, a cold tier file may be a flat file without an internal hierarchy. The flat file may also be a write once read many times file also referred to as a read only database (RODB) file. In some embodiments, a cold tier may further include a cold tier directory file, such as a cold tier directory file of local cold tier 250 or a cold tier directory file of remote cold tier 252. The cold tier directory file may include an ordered list of key-values for data items that have been relocated to the respective cold tier and associated mappings of storage locations in the cold tier flat files where the corresponding data items are stored.

In some embodiments, a client may individually specify access level QoS policies for cold tiers associated with individual tables. For example, a client may specify a local access level cold tier policy for warm tier table 1. In response, a configuration manager, such as configuration manager 136, may configure a local cold tier, such as local cold tier 250 for warm tier table 1. In some embodiments, a local cold tier may be implemented on a same node or set of nodes that implement a warm tier. Also, in some embodiments, a local cold tier may be implemented on one or more other nodes that are local to a node that implements a warm tier, such as nodes located near a node that implements the warm tier.

In some embodiments, a client may also specify a remote cold tier access level for individual tables, or a data store may default to a remote cold tier access level QoS policy for one or more tables unless specified otherwise by a client. In accordance with a remote cold tier access level QoS policy, a configuration manager, such as configuration manager 136, may configure a remote cold tier, such as remote cold tier 252, on one or more remote nodes, such as nodes of an object-based storage node system 212. For example, respective cold tiers for warm tier tables 2 and 3 are configured as remote cold tier 252 which includes a cold tier table 2 flat file and a cold tier table 3 flat file, along with a shared cold tier directory file. In some embodiments, separate directory files may be included in a remote cold tier for different cold tier table flat files, such as in remote cold tier 252 for table 2 and table 3, or multiple tables may share a common cold tier directory (as shown).

In some embodiments, a resource manager, such as resource manager 104, may store a data item that is to be relocated to a cold tier to a storage node in the cold tier storage and send a notification to a cold tier engine, such as cold tier engine 214, that the data item has been added to a cold tier storage of the cold tier. In response, the cold tier engine may add a key value and mapping for the data item to a cold tier directory file, such as cold tier table 1 directory file or the cold tier directory file of remote cold tier 252, depending on which cold tier configuration is associated with the warm tier table from which the data item is being relocated. In some embodiments, a cold tier engine may add the data item to an existing cold tier file, such as one of the cold tier table 1, 2, or 3 flat files, by reading the cold tier file into memory, appending the data item into the cold tier flat file and storing a new version of the cold tier flat file that includes the data item.

In some embodiments, tiers such as warm tier 110 and cold tier 112, of a data store, may be transparent to the client after submitting client specifications to select policies for the tiering service. For example, from a client's perspective warm tier table 1 that includes at least some data items stored in primary node system 202 and at least some data items that have been relocated to local cold tier 250 may appear to the client as a single unified data set and may not appear to the client as different data sets stored in different tiers of a data store. In a similar manner, from a client's perspective warm tier table 2 or 3 that includes at least some data items stored in primary node system 202 and at least some data items that have been relocated to remote cold tier 252 may appear to the client as a single unified data set and may not appear to the client as different data sets stored in different tiers of a data store.

Remote Cold Tier with Local Cache Access Policy

Figure 2B:
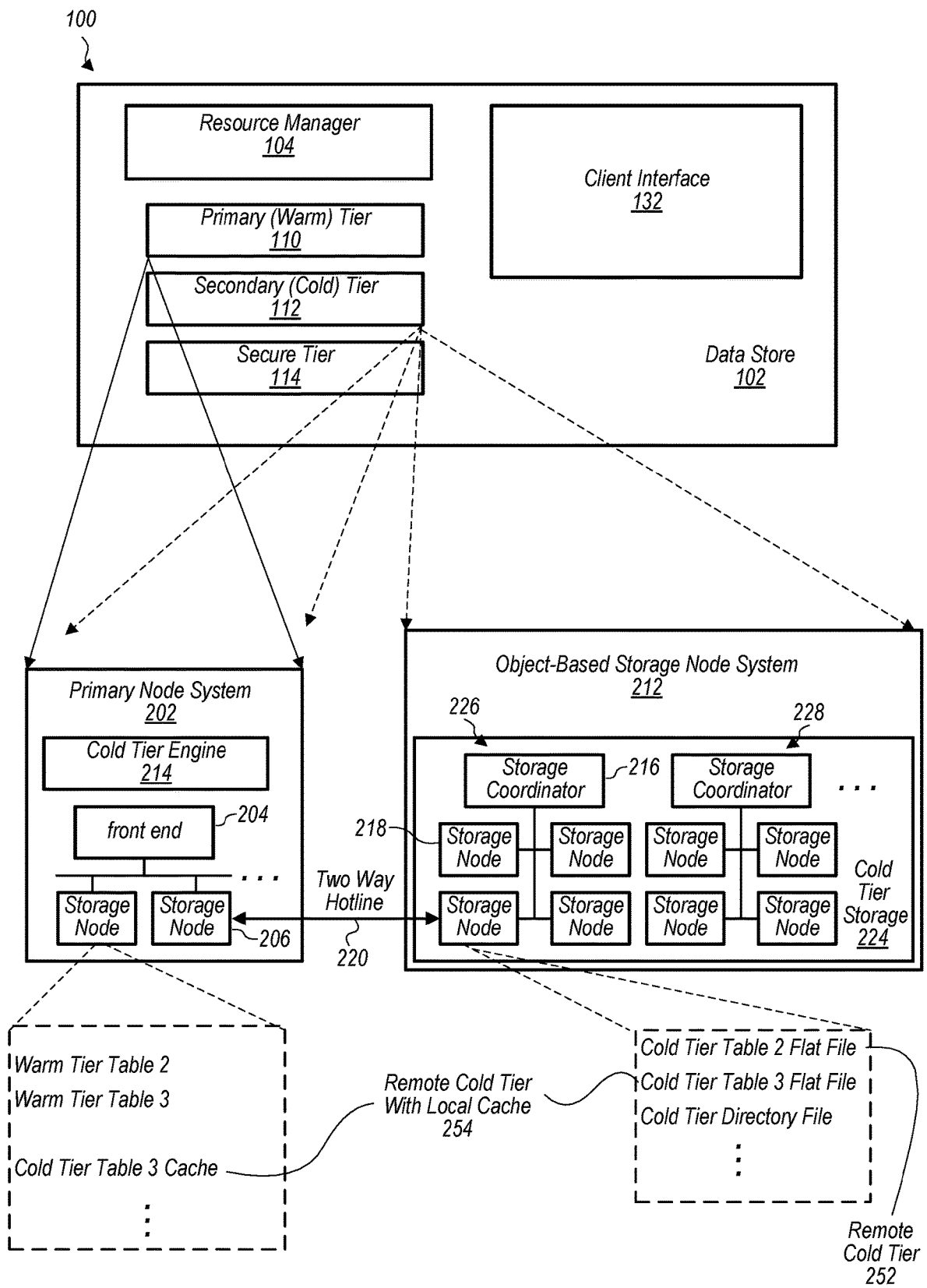
FIG. 2B illustrates further aspects of a warm tier and a remote cold tier with local caching, according to some embodiments.

FIG. 2B illustrates further aspects of a warm tier and a remote cold tier with local caching, according to some embodiments. The data store 102, primary node system 202 and object-based storage node system 212 illustrated in FIG. 2B may be the same or similar as the corresponding components discussed above in regard to FIG. 2A.

However, in FIG. 2B, a client may have selected a remote cold tier with local caching access policy for table 3 and a remote cold tier access policy for table 2. In response to selecting a remote cold tier with local caching access policy for table 3, a cold tier flat file for table 3 may be stored in a remote node, such as one of nodes 218 of object-based storage node system 212. In some embodiments, a cold tier directory stored in the remote node may also be updated to include key values for the data items stored in the cold tier table 3 flat file. Additionally, a local cache may be established on a local node such as cold tier table 3 cache stored in one of storage nodes 206 of primary node storage system 202. In some embodiments, a local cache for a remote cold tier may include a cold tier directory for data items of the cold tier that are stored in a remote node. The cold tier directory file may include key values for data items stored in the cold tier and pointers for where the data items are stored in one or more remotely stored cold tier flat files. Thus, a routing manager may locally determine an address for a data item in a cold tier flat file and directly access the data item from the cold tier flat file without having to determine an address for the data item using a cold tier directory stored remotely. In some embodiments, such as the one illustrated in FIG. 2B, a cold tier directory file of a remote node may include entries for cold tier flat files for more than one table. Accordingly, locating a user key for a particular data item in a shared cold tier directory may involve searching through more cold tier directory entries and may consume more system resources than searching a locally stored directory file that includes fewer entries. For example, in some embodiments, a locally cached directory file may only include entries for a single table.

In some embodiments, a two-way hotline, such as two-way hotline 220, may be used to retrieve data for a data item stored in a cold tier based on an address for the data item stored in a local cache, such as cold tier table 3 cache. In this way, a local storage node, such as one of storage nodes 206 may directly retrieve data for a data item according to a locally cached address and may bypass one or more intermediary systems such as a storage coordinator of an object-based storage node system, such as storage coordinator 216 of object-based storage node system 212. This may provide faster access with less overhead processing costs than retrieving the data item using a remote cold tier directory file.

Local Cold Tier with Local Replica Access Policy

Figure 2C:
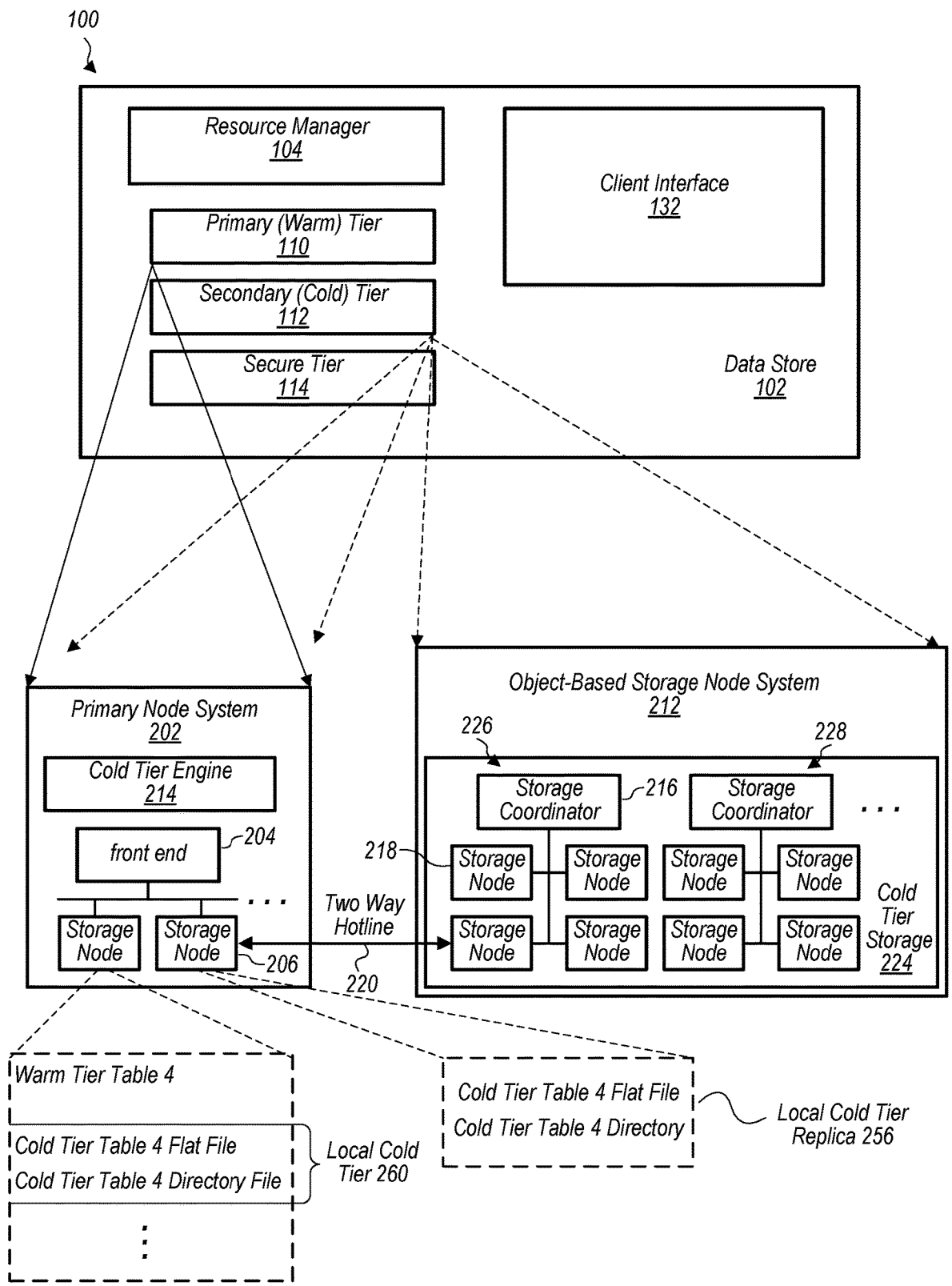
FIG. 2C illustrates further aspects of a warm tier, a local cold tier, and a local cold tier replica, according to some embodiments.

FIG. 2C illustrates further aspects of a warm tier, a local cold tier, and a local cold tier replica, according to some embodiments. The data store 102, primary node system 202 and object-based storage node system 212 illustrated in FIG. 2C may be the same or similar as the corresponding components discussed above in regard to FIGS. 2A-2B.

A local cold tier such as local cold tier 260 may be a similar local cold tier as local cold tier 250 described in FIG. 2A. However, in order to further improve access performance, a client may select for the local cold tier to include one or more replicas. For example, a first node and another node of storage nodes 206 each store cold tier table 4 flat file and cold tier table 4 directory, wherein one of the nodes 206 stores a local cold tier replica 256 of local cold tier 260.

Because respective nodes of a primary node system, such as primary node system 202, have finite capabilities, in order to further increase capacity beyond the capabilities of a single node, for example for IOPS, a local cold tier may be replicated one or more times, where the replicas are stored on separate nodes each having their own respective capabilities. In this way, a local cold tier's capabilities, for example to process access requests, may be increased beyond the capabilities of the individual nodes on which the cold tier is implemented. In some embodiments, access requests may be load balanced amongst nodes that implement a local cold tier with local cold tier replicas. For example, access requests may be load balanced between local cold tier 260 and local cold tier replica 256, each implemented on different ones of nodes 206 of primary node system 202.

Single-Tenant Local Cold Tier Access Policy

Figure 2D:
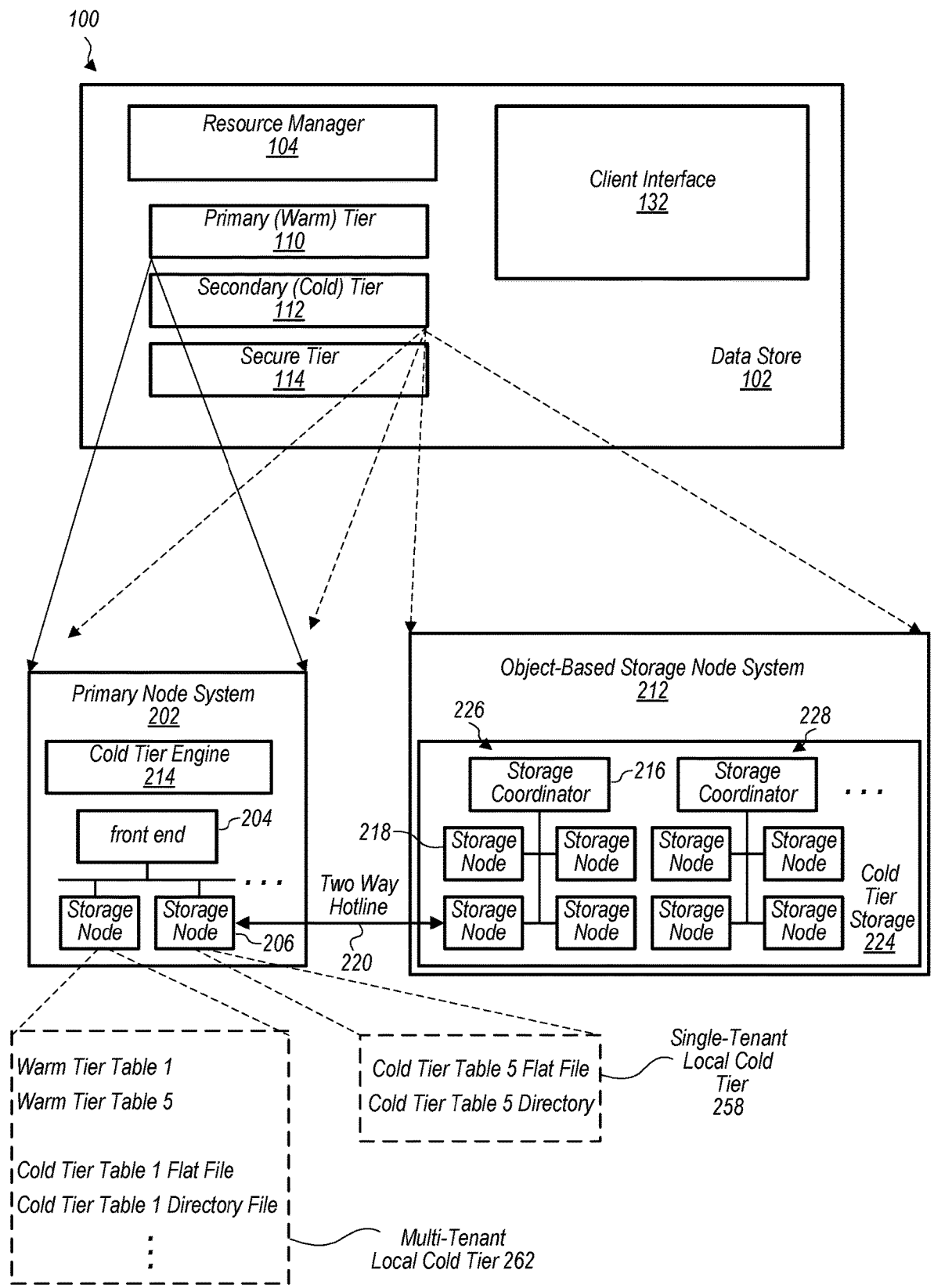
FIG. 2D illustrates further aspects of a warm tier and a single-tenant local cold tier, according to some embodiments.

FIG. 2D illustrates further aspects of a warm tier and a single-tenant local cold tier, according to some embodiments. The data store 102, primary node system 202 and object-based storage node system 212 illustrated in FIG. 2D may be the same or similar as the corresponding components discussed above in regard to FIG. 2A-2C.

In some embodiments, a client may specify a single-tenant local cold tier access policy. In some situations the client may be storing sensitive data and may desire a single-tenant storage solution for security or isolation reasons. In other situations, a client may desire dedicated resources that are not impacted by demand placed on the resources by other clients of the data store. In some situations, a client may request a single-tenant local cold tier access policy for other reasons.

As shown in FIG. 2D, a single-tenant cold tier may be implemented on a dedicated node, such as one of nodes 206 that is not shared with other tenants of the provider network. For example, cold tier table 5 flat file and cold tier table 5 directory are stored on one of nodes 206 to implement single-tenant cold tier 258. In contrast, a cold tier for table 1 is implemented on another node of storage nodes 206 that also stores both warm tier table 1 and warm tier table 5. Thus, the other cold tier, multi-tenant cold tier 262, is stored on a node that stores data for multiple clients of a provider network, such as a provider network that includes system 100.

Example Warm Tier Table Including Tombstones

Figure 3:
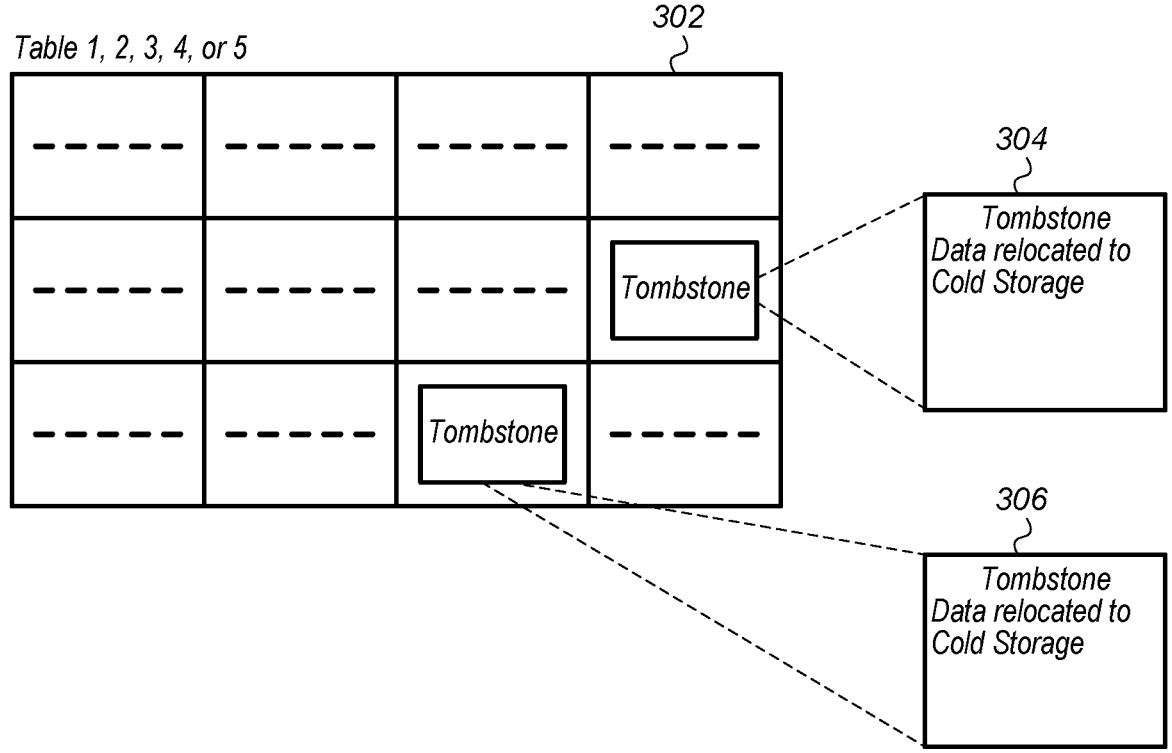
FIG. 3 illustrates a warm tier table that includes tombstones for data items that have been relocated from the warm tier to a cold tier, according to some embodiments.

FIG. 3 illustrates a warm tier table that includes tombstones for data items that have been relocated from the warm tier to a cold tier, according to some embodiments.

Table 302 representing tables 1, 2, 3, 4, or 5 may be the same as any of the warm tier tables described in FIG. 1 or any of the warm tier tables described in FIG. 2.

In some embodiments, in accordance with a client specified tiering policy and client specified tombstone forwarding policy, one or more data items included in a table or scope stored in a warm tier of a data store may be relocated to a cold tier and replaced in the warm tier with a tombstone. For example tombstone 304 and tombstone 306 represent data items that have been relocated to a cold tier. In some embodiments, a client specified tombstone forwarding policy may specify that detailed address information for a relocated data item is to be included in a tombstone for the relocated data item. In some embodiments, a tombstone forwarding policy may require that location information included in the tombstone indicates that the data item has been relocated to a cold tier, but may not require that the location information include a particular address within the cold tier at which the relocated data item is stored.

In some embodiments, a tombstone may indicate whether a cold tier for the table is implemented according to a remote cold tier access policy, a local cold tier access policy, a remote cold tier with local caching access policy, or a local cold tier with local replicas cold tier access policies. In some embodiments, respective access policies may be assigned to a table such that an access policy for a data item indicated in a tombstone may be inferred based on the tombstone being included in a warm tier table with a corresponding assigned cold tier access policy.

Illustrative Method for Configuring a Cold Tier

Figure 4:
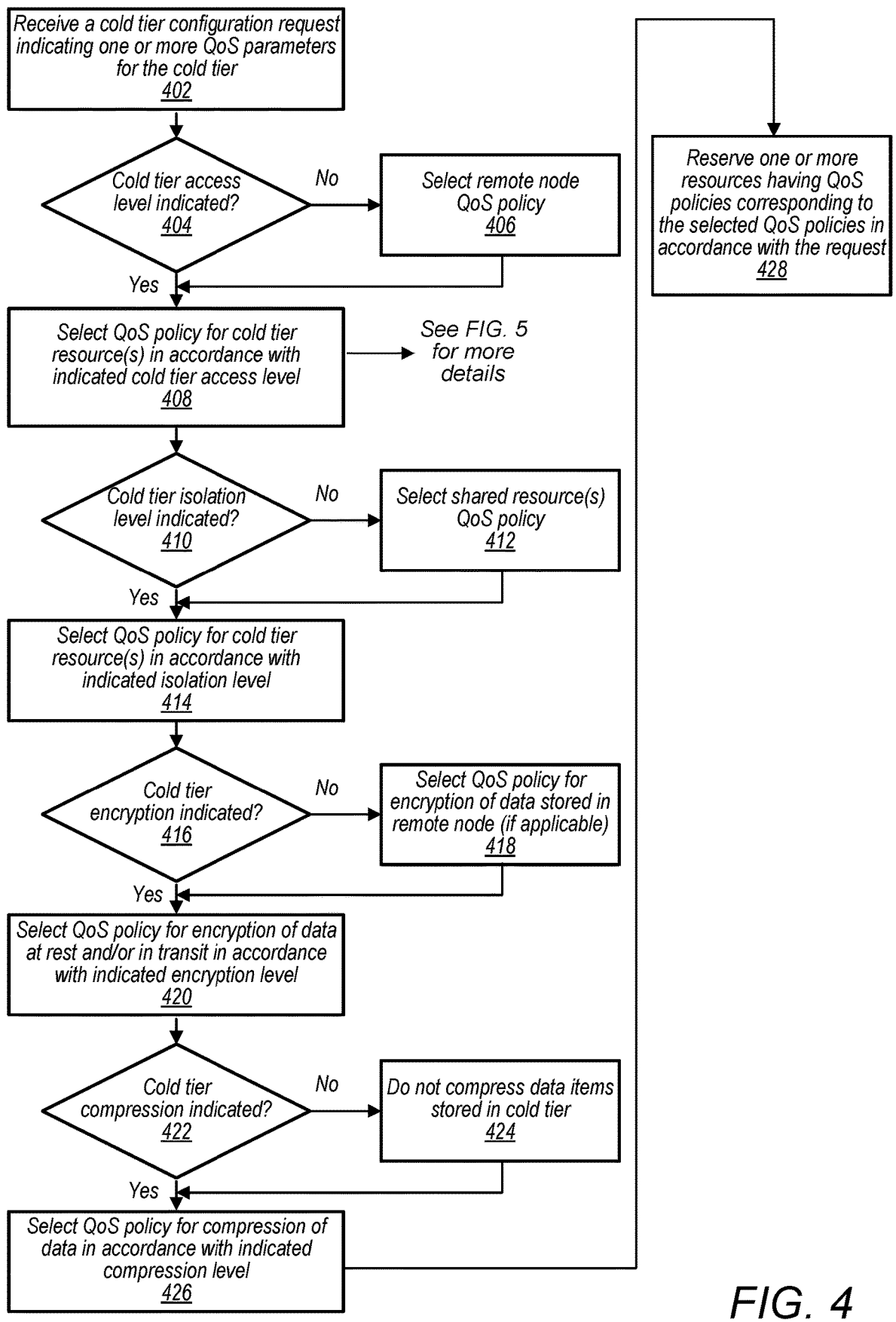
FIG. 4 is a flowchart illustrating a cold tier being configured in accordance with one or more client specified quality of service (QoS) parameters, according to some embodiments.

FIG. 4 is a flowchart illustrating a cold tier being configured in accordance with one or more client specified quality of service (QoS) parameters, according to some embodiments.

At 402, a configuration manager of a data store receives a cold tier configuration request. The cold tier configuration request may indicate one or more QoS parameters for a cold tier that is to be configured in accordance with the request. For example the cold tier configuration request may specify a cold tier access level policy, a cold tier encryption policy, a cold tier isolation policy, a cold tier compression policy, or other cold tier policies.

At 404, it is determined if the cold tier configuration request indicates a cold tier access level policy for the cold tier that is to be configured. If not a default cold tier access level policy is selected at 406, such as a remote cold tier access policy with a shared cold tier directory. Alternatively, if a cold tier access level policy is indicated in the cold tier configuration request, at 408 a cold tier access level policy corresponding to the indication is selected for configuring the cold tier. For example one of the cold tier access policies 152 as discussed in regard to FIG. 1 may be selected for implementing the cold tier. Note, FIG. 5 describes in more detail selection of a cold tier access level policy.

At 410, it is determined if the cold tier configuration request indicates a cold tier isolation level for the cold tier that is to be configured. If a cold tier isolation level is not indicated, a default isolation level is selected at 412, such as a shared resources QoS policy in regard to isolation. Alternatively, if an isolation level is indicated in the cold tier configuration request, at 414 a cold tier isolation level policy corresponding to the indication is selected for configuring the cold tier.

At 416, it is determined if the cold tier configuration request indicates a cold tier encryption policy for the cold tier that is to be configured. If a cold tier encryption policy is not indicated, a default encryption policy is selected at 418, such as encryption of data items stored in a remote cold tier. For example, an object-based storage node system may include built-in encryption of data objects at rest that are stored in the object-based storage node system. Thus, by default data items stored in a remote cold tier using an object-based storage node system may be encrypted while at rest. Alternatively, if an encryption policy is indicated in the cold tier configuration request, at 420 a cold tier encryption policy corresponding to the indication is selected for configuring the cold tier. For example, a cold tier encryption policy may specify that data items are to be encrypted while at rest in a local cold tier and/or a remote cold tier. Also, a cold tier encryption policy may specify that data items are to be encrypted while in transit. For example, data items may be encrypted while being relocated from a warm tier to a cold tier and when being retrieved from a cold tier. In some embodiments, a cold tier encryption policy may allow a client to specify an encryption key to be used to encrypt the client's data items. In other embodiments, a configuration manager, such as configuration manager 136, may manage encryption keys without further client involvement.

At 422, it is determined if the cold tier configuration request indicates a cold tier compression policy for the cold tier that is to be configured. If a cold tier compression policy is not indicated, a default compression policy is selected at 424, such as no compression. Alternatively, if a compression policy is indicated in the cold tier configuration request, at 426 a cold tier compression policy corresponding to the indication is selected for configuring the cold tier. In some embodiments, a data store may support multiple compression algorithms and a client may specify via a cold tier compression policy selection one or more of the compression algorithms that are supported by the data store to use for compressing the client's data items that have been relocated to the cold tier. In some embodiments, a client may submit a compression algorithm to be used to compress the client's data items that have been relocated to the cold tier. In some embodiments, a cold tier compression policy may include one or more rules for compressing data items wherein different compression algorithms are used for compressing different types of data items according to the rules. For example, a video encoder may be used to compress video data items, whereas an image encoder may be used to compress image data items. In a similar manner, other types of compression algorithms may be used to compress different types of data items, such as text or audio data items.

At 428 one or more resources that support the QoS policies selected in 404-426 are reserved for the cold tier. In addition, the reserved resources are configured in accordance with the selected QoS policies. For example, the reserved resources may include storage nodes of a primary node system, such as primary node system 202 or storage nodes of an object-based storage node system, such as object-based storage node system 212. In some embodiments, resources on other types of systems may be reserved to implement a cold tier.

Figure 5:
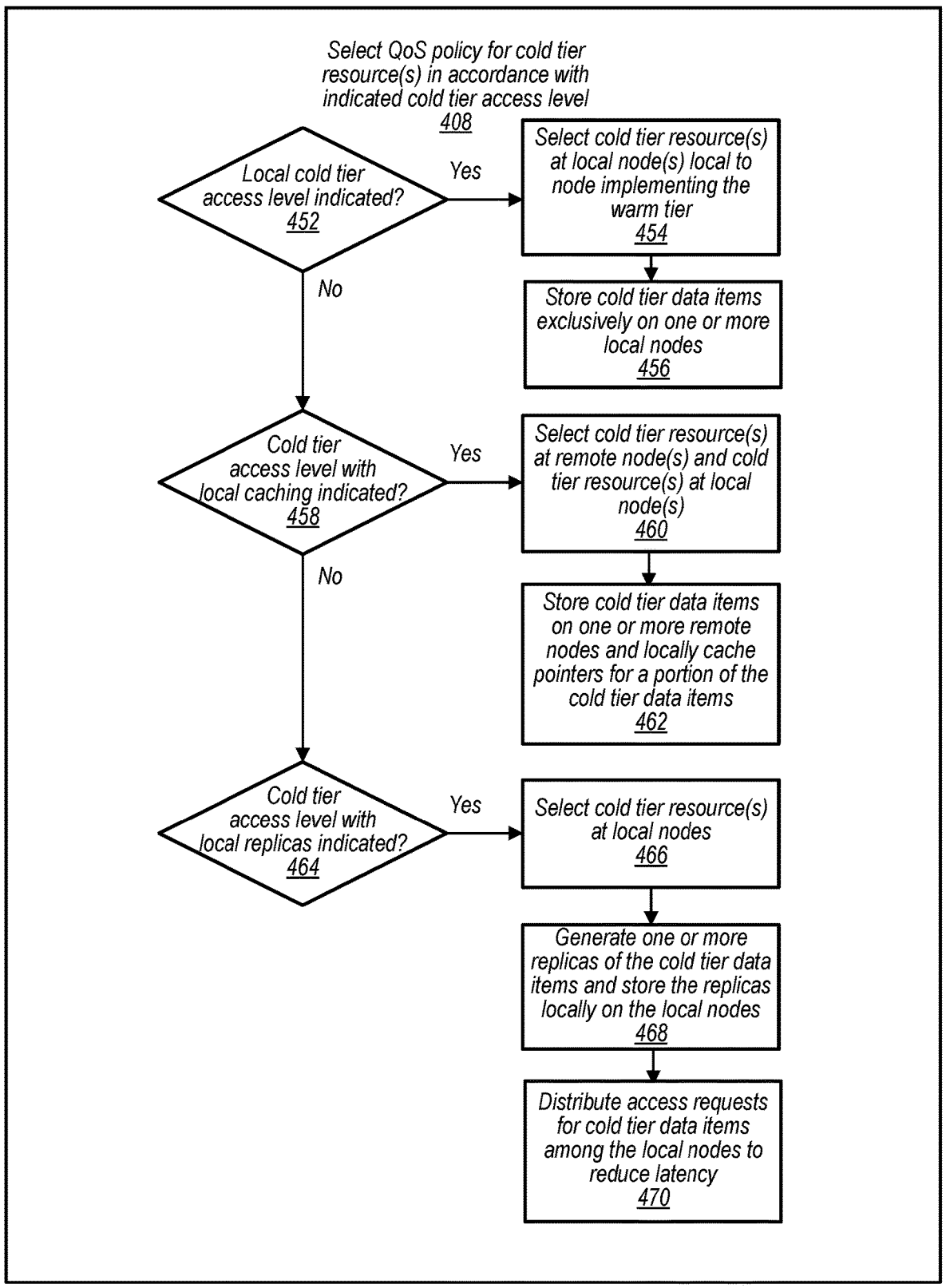
FIG. 5 is a flowchart illustrating a more detailed view of configuring a cold tier in accordance with a client specified cold tier access level, according to some embodiments.

FIG. 5 is a flowchart illustrating a more detailed view of configuring a cold tier in accordance with a client specified access level, according to some embodiments. The steps shown in FIG. 5 may be performed as part of step 408 described above regarding selecting a QoS policy for cold tier resource(s) in accordance with an indicated cold tier access level specified in the cold tier configuration request.

At 452 it is determined if the indicated cold tier access level is a local cold tier access level. If so, at 454 cold tier resources on a local node that implements the warm tier are reserved, or cold tier resources on a local node proximate to the node that implements the warm tier are reserved. Also, at 456 cold tier data items are stored in the one or more local nodes reserved at 454. For example, the data items are stored locally as opposed to remotely.

If a local cold tier access policy is not indicated, it is determined at 458 whether a remote cold tier with local caching access policy is indicated. If so, at 460 cold tier resources on a local node that implements the warm tier are reserved, or cold tier resources on a local node proximate to the node that implements the warm tier are reserved and additionally cold tier resources on a remote node(s) are reserved. Data items are added to one or more flat files stored on the remote node(s) and a directory of user-keys and pointers to storage locations of the data items in the flat files stored on the remote node are stored in a cache implemented on the one or more local nodes.

At 464, it is determined if a local cold tier with local replicas cold tier access level policy is indicated in the cold tier configuration request. If so, at 466 resource on two or more local nodes are reserved. At 468 replicas of the cold tier data items are generated. The cold tier data items are stored in a first flat file on one of the reserved nodes and one or more sets of replicas of the data items are stored in one or more additional flat files on respective other ones of the reserved nodes. Also each node includes a cold tier directory for the data items stored on the respective node. Thus, the two or more nodes may process access requests to the cold tier data items in parallel and workloads between the nodes of the cold tier may be load balanced. For example, at 470 access requests for cold tier data items are distributed among the local nodes of the cold tier to reduce access latency times.

Illustrative Method for Modifying a Cold Tier Configuration

Figure 6:
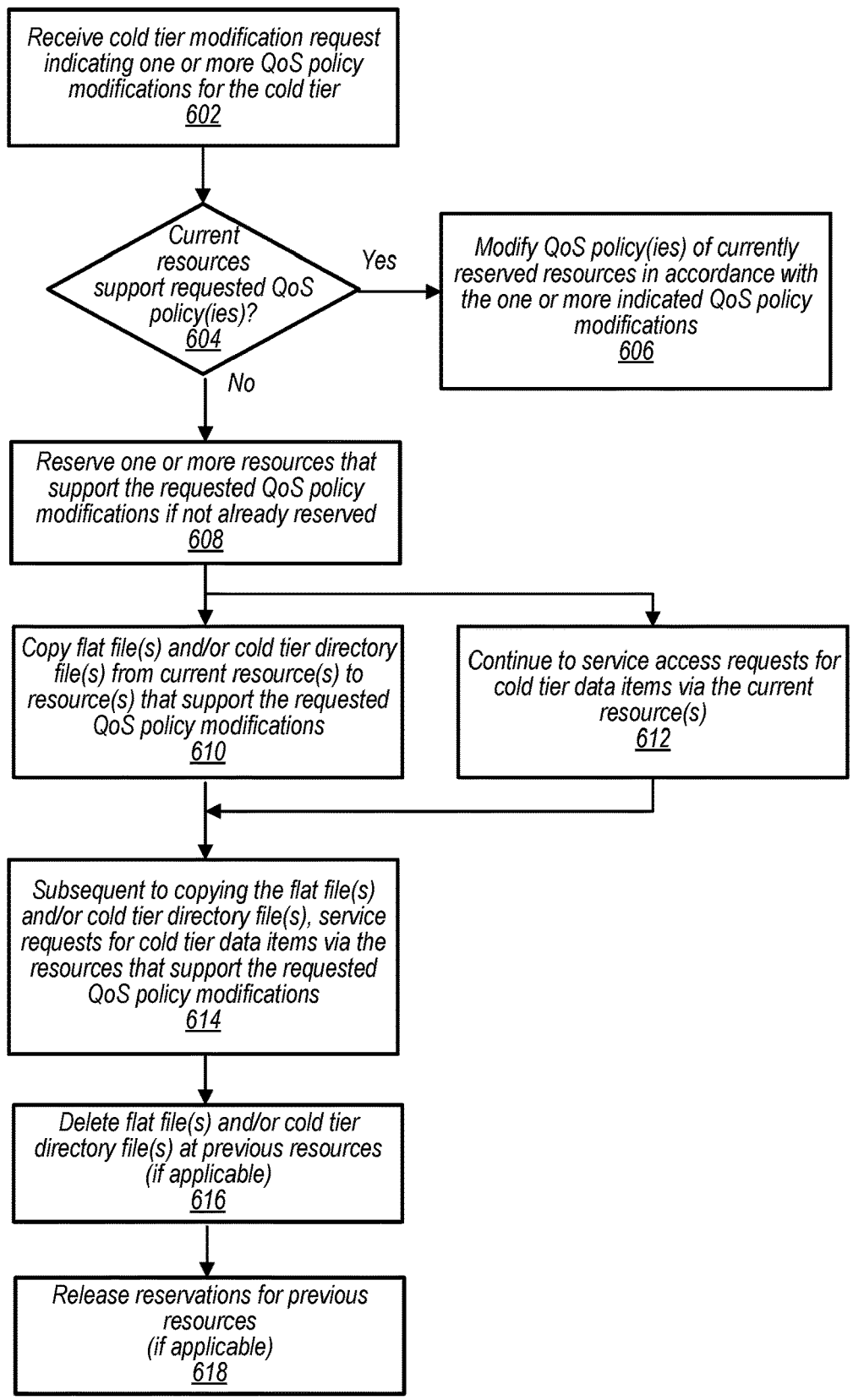
FIG. 6 is a flowchart illustrating modifying a cold tier configuration, according to some embodiments.

FIG. 6 is a flowchart illustrating modifying a cold tier configuration, according to some embodiments.

At 602, a cold tier modification request is received by a configuration manager, such as configuration manager 136. The cold tier modification request may indicate one or more QoS policies for the cold tier that are to be modified. As an example, a client may request to change a cold tier access level policy in order to more quickly search cold tier data items. Conversely, when lower latency access is no longer needed a client may request to change a cold tier access level policy to a less expensive cold tier access level policy that uses lower cost resources such as remote nodes of an object-based storage node system. Also, a client may modify an encryption policy, isolation policy, compression policy, or other policy of a cold tier via a cold tier modification request. In some embodiments, a cold tier may continue to store data items on an existing configuration while replicating the data items to a modified cold tier configuration. In this way, there may not be any or only minimal interruption in the cold tier due to a cold tier configuration modification. For example, a cold tier may continue to provide access to data items stored in an existing cold tier configuration while replicating data items to a modified cold tier configuration. Once the data items are replicated to the modified cold tier configuration, an indication may be sent, for example, to a routing manager, such as routing manager 134, to transition to the modified cold tier configuration. Also, the data items stored in the previous cold tier configuration that was replicated to the modified cold tier configuration may be deleted once the cold tier is transitioned to the modified cold tier configuration.

For example, at 604 it is determined whether the current resources reserved for the current cold tier configuration support the requested QoS policies that are to apply for the modified cold tier configuration. For example, in some embodiments, wherein an encryption policy or a compression policy is being modified, as a few examples, the existing resources may support the modified encryption policy or compression policy. In such situations, data items may not need to be replicated to different resources, but instead an encryption policy or a compression policy being applied by existing resources of the current cold tier configuration may be changed to the modified encryption policy or modified compression policy to implement the modified cold tier configuration.

However, in other situations, such as modifications to a cold tier access level policy, or a cold tier isolation policy, the existing cold tier resources may not support the modified QoS policy. For example, if the current cold tier configuration is a remote cold tier and the modified cold tier configuration is a local cold tier, data items stored in one or more remote nodes may be replicated to one or more local nodes to change the cold tier configuration to a local cold tier access level QoS configuration. For example, at 606, QoS policies of existing resources are modified if the existing resources support the requested QoS policies for the modified cold tier configuration. Conversely, at 608 one or more additional resources that support the requested QoS policies for the modified cold tier configuration are reserved if the existing resources of the current cold tier configuration do not support the QoS policies for the modified cold tier configuration.

At 610 flat files and/or directory files are copied from resources implementing the current cold tier configuration to the one or more resources reserved for the modified cold tier configuration. At the same time, at 612, the resources implementing the current cold tier configuration continue to service access requests to the cold tier while the flat files and directory files are being copied to the reserved resources for the modified cold tier configuration.

At 614, subsequent to the flat files and/or the directory files being copied to the resources reserved for implementing the modified cold tier configuration, the modified cold tier configuration begins to service access requests directed to the cold tier in accordance with the modified QoS policies indicated in the cold tier configuration modification request. In some embodiments, a notification may be sent to a client when the cold tier configuration modification is complete.

For example, a client desiring to modify a cold tier configuration to perform searching of the cold tier may be provided an indication that the configuration modification has completed so that the client may begin searching the cold tier with the modified configuration (though the client may have already been searching the cold tier while the configuration was being modified).

At 616, the flat files and/or directory files remaining stored on the resources used to implement the previous cold tier configuration (and not used to implement the modified cold tier configuration) may be deleted. Also, at 618 reservations for the resources used to implement the previous cold tier configuration may be released.

Illustrative Methods for Predicting Usage Amounts for Cold Tier Configurations

Figure 7A:
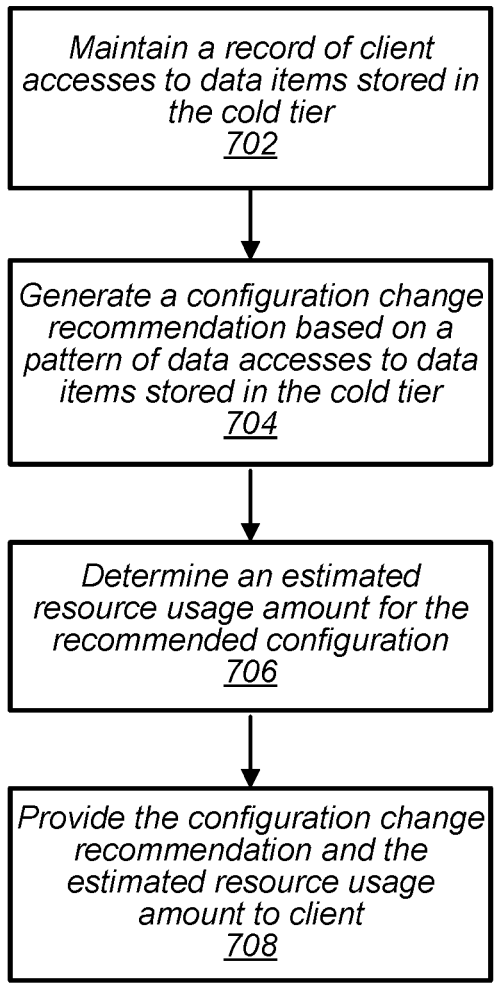
FIG. 7A is a flowchart illustrating providing cold tier configuration recommendations according to a heuristic model, according to some embodiments.

FIG. 7A is a flowchart illustrating providing cold tier configuration recommendations according to a heuristic model, according to some embodiments.

At 702, a record of client access to data items is maintained for data items stored in a cold tier. For example, a client interface, such as client interface 132, may cause a record to be maintained for client accesses of data items stored in a cold tier.

At 704, a configuration change recommendation is generated, for example by a configuration manger of a data store, such as configuration manger 136 of data store 102. The configuration recommendation may be generated based, at least in part, on one or more access patterns included in the record of client accesses maintained by the client interface. For example, the configuration manager may detect a change in an access pattern indicating that searching of cold tier data items is being performed.

At 706, an estimated resource usage amount is determined for the recommended configuration change. For example, the estimated resource usage amount may indicate an amount of higher cost resources or lower costs resources that may need to be reserved to implement the recommended configuration change. In some embodiments, a cost of the recommended configuration change may be determined. For example a cost of reserving higher performance resources to implement the cold tier, such as in a local cold tier access level policy, as an example, may be determined.

At 708, the configuration change recommendation and estimated usage amount may be provided to a client. In response, the client may indicate to modify the cold tier configuration to the recommended configuration. In some embodiments, a data store may include one or more rules for automatically implementing a cold tier configuration change recordation. For example, a client may specify a rule that if a recommended cold tier change results in a usage amount change below a threshold amount, then the recommended cold tier configuration change is to be automatically implemented. In some embodiments, the configuration manager may utilize a heuristic model to determine the estimated usage amounts based on past access patterns included in the access pattern record.

Figure 7B:
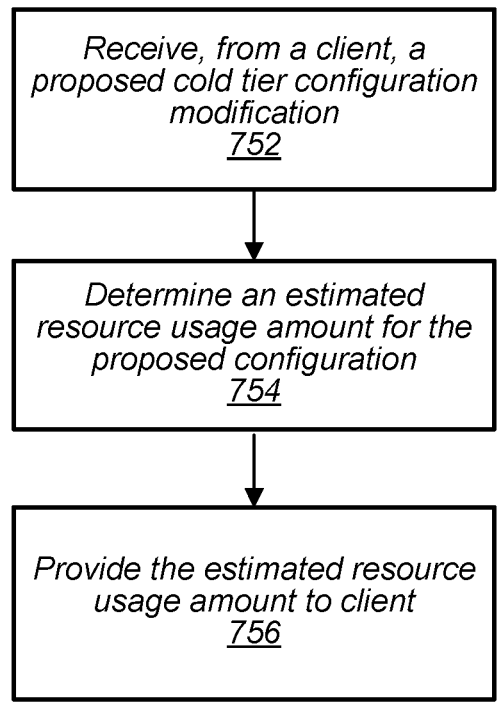
FIG. 7B is a flowchart illustrating providing a cold tier resource usage estimate according to a simulation model, according to some embodiments.

FIG. 7B is a flowchart illustrating providing a resource usage estimate according to a simulation model, according to some embodiments. A simulation model may allow a client to "test" various cold tier configurations and determine expected performance and usage amounts for multiple proposed cold tier configurations or cold tier modifications.

At 752, a configuration manager, such as configuration manager 136, receives a proposed cold tier configuration or cold tier configuration modification. In some embodiments, a client interface, such as client interface 132, may implement a GUI or other type of interface that includes a dashboard for cold tier performance. In such embodiments, a client may test proposed configuration modifications and observe simulated results of the cold tier configuration modifications via the dashboard. For example, a dashboard may indicate latency times, IOPS, usage amounts, costs, etc.

At 754, the configuration manager determines an estimated resource usage amount and/or other performance parameters for the proposed configuration. At 756, the results are provided to a client, for example via a dashboard or other suitable interface. In response the client may select to make one or more cold tier configuration modifications based on the simulated results.

Illustrative Computer System

Figure 8:
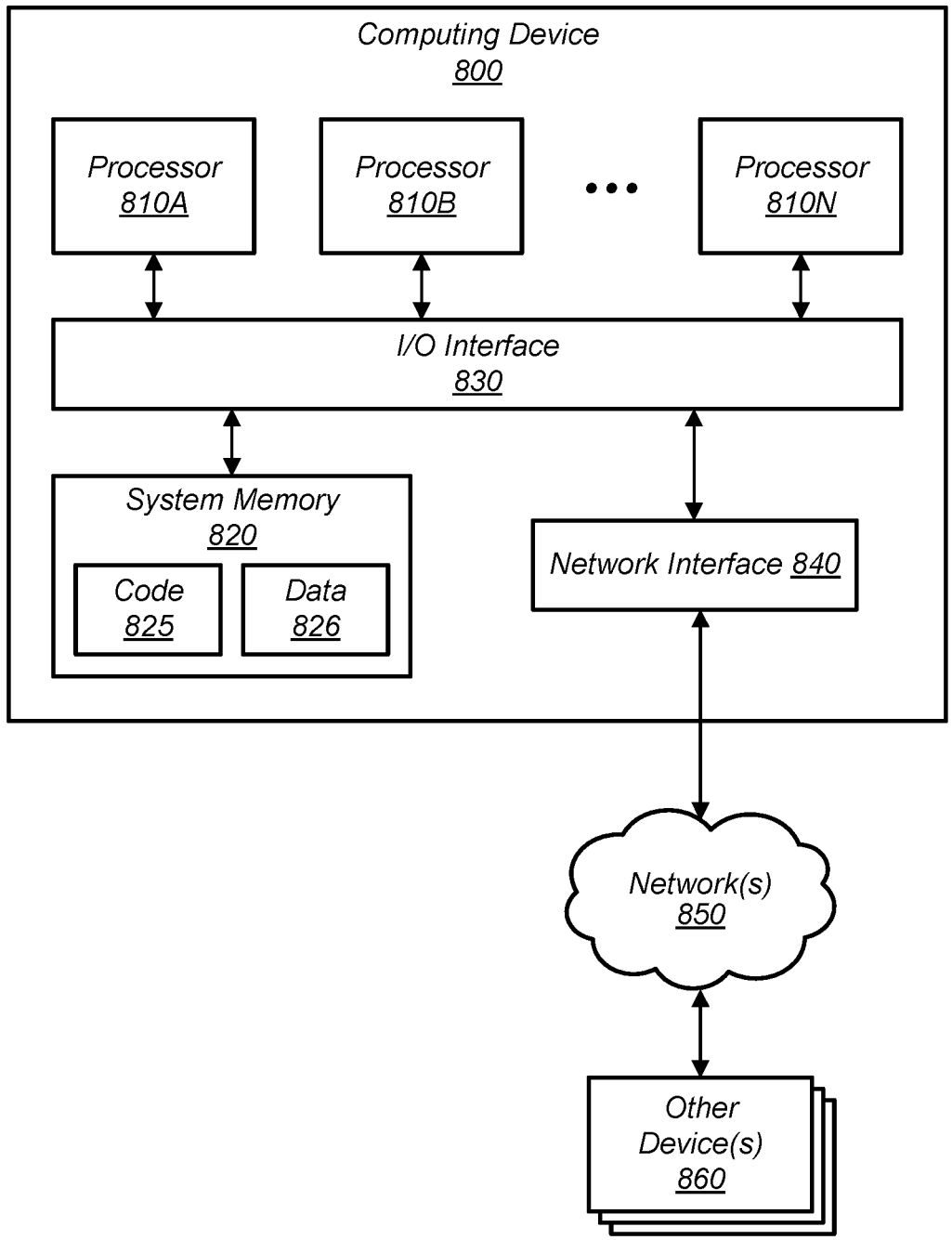
FIG. 8 illustrates an example computing device that may be used in some embodiments.

In at least some embodiments, a computer system that implements a portion or all of one or more of the technologies described herein may include a computer system that includes or is configured to access one or more computer-readable media. FIG. 8 illustrates such a computing device 800. In the illustrated embodiment, computing device 800 includes one or more processors 810A-810N coupled to a system memory 820 via an input/output (I/O) interface 830. Computing device 800 further includes a network interface 840 coupled to I/O interface 830.

In various embodiments, computing device 800 may be a uniprocessor system including one processor or a multiprocessor system including several processors 810A-810N (e.g., two, four, eight, or another suitable number). Processors 810A-810N may include any suitable processors capable of executing instructions. For example, in various embodiments, processors 810A-810N may be processors implementing any of a variety of instruction set architectures (ISAs), such as the x86, PowerPC, SPARC, or MIPS ISAs, or any other suitable ISA. In multiprocessor systems, each of processors 810A-810N may commonly, but not necessarily, implement the same ISA.

System memory 820 may be configured to store program instructions and data accessible by processor(s) 810A-810N. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code (i.e., program instructions) 825 and data 826.

In one embodiment, I/O interface 830 may be configured to coordinate I/O traffic between processors 810A-810N, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processors 810A-810N.

Network interface 840 may be configured to allow data to be exchanged between computing device 800 and other devices 860 attached to a network or networks 850. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 800 via I/O interface 830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 800 as system memory 820 or another type of memory. Further, a computer-readable medium may include transmission media or signals such as electrical, electromagnetic, or digital signals, conveyed via a communication medium such as a network and/or a wireless link, such as may be implemented via network interface 840. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system comprising:
a plurality of nodes configured to implement a data store comprising a warm tier and a cold tier, wherein the warm tier has a lower latency for data access than the cold tier; and
one or more computing devices configured to implement a configuration manger configured to:
receive a cold tier configuration request indicating one or more of a plurality of cold tier quality of service (QoS) parameters for storing data items in the cold tier that have been relocated to the cold tier from the warm tier; and
reserve resources to implement the cold tier in accordance with the one or more QoS parameters indicated in the cold tier configuration request,
wherein:
in response to the request indicating a first cold tier access level, the configuration manager is configured to reserve one or more resources to implement the cold tier of a local node, local to a node implementing the warm tier; or
in response to the request indicating a second cold tier access level, the configuration manager is configured to reserve one or more resources to implement the cold tier of a remote node, remote from the node implementing the warm tier.

2. The system of claim 1, wherein:
the node implementing the warm tier implements at least a portion of a non-searchable query language (NoSQL) database storing at least a portion of a plurality of data items stored in the data store for a client, and the one or more resources of the local node or the remote node implement at least a portion of an object-based storage system,
wherein the one or more resources implementing the at least a portion of the object-based storage system store one or more flat files comprising data items stored in the data store for the client that have been relocated from the NoSQL database of the warm tier to the object-based storage system of the cold tier.

3. The system of claim 1, wherein at least one of the one or more QoS parameters indicated in the request indicates that resources reserved to implement the cold tier are to be single-tenant resources,
wherein to reserve resources to implement the cold tier in accordance with the at least one QoS parameter, the configuration manager is configured to reserve the one or more resources to implement the cold tier at a single-tenant node.

4. The system of claim 1, wherein at least one of the QoS parameters indicated in the request is a third cold tier access level, wherein in response to the request indicating the third cold tier access level, to reserve the resources to implement the cold tier in accordance with the request, the configuration manager is configured to reserve:
one or more resources of a remote node, remote from the node implementing the warm tier; and
one or more resources of a local node, local to the node implementing the warm tier,
wherein the one or more resources of the remote node implement a cold tier storage for storing the client's data items that have been relocated to the cold tier, and
wherein the one or more resources of the local node implement a local cold tier cache for locally storing pointers to at least a portion of the client's data items that have been relocated to the cold tier.

5. A method comprising:
receiving a cold tier configuration request for configuring a cold tier of a data store for a client of a data storage service, wherein the data store comprises a warm tier and the cold tier, wherein the warm tier has a lower latency for data access than the cold tier, wherein the cold tier configuration request indicates one or more quality of service (QoS) parameters for the cold tier, wherein the one or more QoS parameters indicates at least a first cold tier access level for the cold tier;
reserving one or more resources to implement the cold tier of the data store in accordance with the one or more QoS parameters, wherein, in accordance with the first cold tier access level, the one or more resources are reserved at a local node, local to a node implementing the warm tier of the data store;
receiving another cold tier configuration request for configuring another cold tier for another client of the data storage service, wherein the other cold tier configuration request indicates one or more QoS parameters for the other cold tier, wherein the one or more QoS parameters indicates at least a second cold tier access level for the other cold tier, and
reserving one or more resources to implement the other cold tier in accordance with the one or more QoS parameters indicated in the other request, wherein, in accordance with the second cold tier access level, the one or more resources for the other cold tier are reserved at one or more remote nodes, remote from a node implementing the warm tier.

6. The method of claim 5, wherein:
the warm tier of the data store comprises two or more NoSQL database tables, and
the cold tier of the data store and the other cold tier of the data store each comprise:
one or more flat files storing data items relocated from one or more of the NoSQL database tables to the cold tier or the other cold tier.

7. The method of claim 6, further comprising:
receiving a cold tier modification request for the other cold tier, wherein the cold tier modification request indicates the second cold tier access level is to be applied for the other cold tier; and
copying one or more flat files stored on the one or more remote nodes to a local node, wherein requests for data items stored in the other cold tier are serviced via the one or more flat files stored on the one or more remote nodes while the one or more flat files are being copied to the local node; and
servicing, subsequent to said copying, requests for data items stored in the other cold tier via the local node.

8. The method of claim 6, further comprising:
receiving a cold tier modification request for the cold tier of the data store, wherein the cold tier modification request indicates a third cold tier access level is to be applied for the cold tier; and
copying one or more flat files stored on the local node to one or more remote nodes;
generating a cache comprising pointers for at least a portion of the data items stored in the one or more flat files copied to the one or more remote nodes;
determining a storage location for a requested data item included in the at least some flat files based on the cache, wherein the cache is stored at the local node; and
providing the requested data item included in the one or more copied flat files stored at the remote node based on the storage location determined based on the cache stored at the local node.

9. The method of claim 5, wherein one of the QoS parameters of the cold tier configuration request comprises a client specified encryption key, the method further comprising:
encrypting one or more data items stored in the cold tier of the data store in accordance with the client specified encryption key.

10. The method of claim 5, wherein one of the QoS parameters of the cold tier configuration request comprises a client selection for in-transit encryption, the method further comprising:
encrypting data for one or more data items being transmitted between the local node and the one or more remote nodes.

11. The method of claim 5, wherein one of the QoS parameters of the cold tier configuration request comprises a client specified compression algorithm, the method further comprising:
compressing data for data items stored in the cold tier in accordance with the client specified compression algorithm.

12. The method of claim 5, further comprising:
receiving a cold tier configuration request indicating another cold tier access level for the cold tier of the data store, wherein the other cold tier access level indicates local cold tier storage with replicas;
replicating one or more flat files and a cold tier directory stored on the local node for the cold tier to create one or more replicas;

storing the one or more replicas on another local node; and distributing requests for data items stored in the cold tier of the data store among the local node and the other local node.

13. The method of claim 5, further comprising:

maintaining a record of client accesses to data items stored in the cold tier of the data store;

generating a configuration change recommendation based, at least in part, on the record of client accesses to the data items stored in the cold tier of the data store;

determining an estimated resource usage amount if the configuration change recommendation were to be implemented; and providing the estimated resource usage amount to the client.

14. The method of claim 5, further comprising:

receiving, from the client, a proposed cold tier modification for the cold tier of the data store;

determining an estimated resource usage amount if the proposed cold tier modification were to be implemented; and providing the estimated resource usage amount to the client.

15. A non-transitory computer-readable medium storing program instructions that, when executed by one or more processors, cause the one or more processors to:

receive a cold tier configuration request indicating one or more quality of service parameters for storing data items that have been relocated from a warm tier to a cold tier of a data store, wherein the warm tier has a lower latency for data access than the cold tier; and reserve resources to implement the cold tier in accordance with the one or more quality of service parameters indicated in the cold tier configuration request, wherein:

in response to the request indicating a first cold tier access level, one or more resources to implement the cold tier are reserved at a local node, local to a node implementing the warm tier; or in response to the request indicating a different cold tier access level, one or more resources to implement the cold tier are reserved at a remote node, remote from the node implementing the warm tier.

16. The non-transitory computer-readable medium of claim 15, wherein at least one of the one or more QoS parameters indicated in the request is an indication that the first cold tier access level, wherein the first cold tier access level specifies that data items relocated from a first table of the warm tier to the cold tier are to be stored at a local node, local to the node implementing the warm tier.

17. The non-transitory computer-readable medium of claim 16, wherein program instructions, when executed by the one or more processors, further cause the one or more processors to:

receive another cold tier configuration request indicating a second cold tier access level for data items relocated from a second table, wherein the second cold tier access level specifies that data items relocated from the second table to the cold tier are to be stored on one or more remote nodes, remote from the node implementing the warm tier; and reserving resources to implement the cold tier in accordance with the second access level indicated in the other cold tier configuration request, wherein data items relocated from the second table to the cold tier are stored remotely via the resources reserved at the remote node.

18. The non-transitory computer-readable medium of claim 17, wherein the program instructions, when executed by the one or more processors, further cause the one or more processors to:

receive a third cold tier configuration request indicating a third cold tier cold tier access level for data items relocated from a third table, wherein the third cold tier access level specifies that data items relocated from the third table to the cold tier are to be stored on one or more remote nodes with local caching; and reserving resources at a local node and one or more remote nodes to implement the cold tier in accordance with the third cold tier access level indicated in the third cold tier configuration request, wherein data items relocated from the third table to the cold tier are stored remotely via the resources reserved at the one or more remote nodes and pointers for at least a portion of the data items relocated from the third table to the cold tier are locally cached via the resources reserved at the local node.

19. The non-transitory computer-readable medium of claim 18, wherein the program instructions, when executed by the one or more processors, further cause the one or more processors to:

receive a fourth cold tier configuration request indicating a fourth cold tier access level for data items relocated from a fourth table, wherein the fourth cold tier access level specifies that data items relocated from the fourth table to the cold tier are to be stored on a local node with one or more replicas;

reserving resources at the local node and one or more additional local nodes to implement the cold tier in accordance with the fourth cold tier access level indicated in the fourth cold tier configuration request;

storing data items relocated from the fourth table to the cold tier locally via the resources reserved at the local node; and storing one or more replicas of the data items relocated from the fourth table to the cold tier locally via the resources reserved at the one or more additional local nodes.

20. The non-transitory computer-readable medium of claim 15, wherein at least one of the one or more QoS parameters indicated in the request comprises a number of transactions per unit time to be serviced by the cold tier for data items that have been relocated from the warm tier to the cold tier, wherein the program instructions, when executed by the one or more processors, further cause the one or more processors to:

determine a cold tier configuration comprising local resources, remote resources, or a combination of local and remote resources capable of servicing the number of transaction per unit of time specified in the configuration request.

* * * * *